(12) United States Patent
Schmidt

(10) Patent No.: US 12,295,535 B2
(45) Date of Patent: May 13, 2025

(54) PAN CLEANING BRUSH MODULE, CONTROLLER AND METHODS OF SAME

(71) Applicant: Norman G. Schmidt, Burnaby (CA)

(72) Inventor: Norman G. Schmidt, Burnaby (CA)

(73) Assignee: Food Machinery Engineering, LMTD, Surrey (CA)

( * ) Notice: Subject to any disclaimer, the term of this patent is extended or adjusted under 35 U.S.C. 154(b) by 253 days.

(21) Appl. No.: 17/389,316

(22) Filed: Jul. 29, 2021

(65) Prior Publication Data

US 2021/0353123 A1    Nov. 18, 2021

Related U.S. Application Data

(63) Continuation of application No. 17/009,203, filed on Sep. 1, 2020, now Pat. No. 12,102,277, and a
(Continued)

(51) Int. Cl.
*A47L 15/00*     (2006.01)
*A21B 3/16*     (2006.01)
(Continued)

(52) U.S. Cl.
CPC ............ *A47L 15/0092* (2013.01); *A21B 3/16* (2013.01); *A47L 15/0076* (2013.01);
(Continued)

(58) Field of Classification Search
CPC .... A47L 15/39; A47L 15/245; A47L 15/0076; A47L 15/0092; A47L 15/241; A46B 13/02; A21B 3/16
(Continued)

(56) References Cited

U.S. PATENT DOCUMENTS 2,080,197 A  *  5/1937  Brandenburg ......... A23N 12/02
                                                                 15/3.16
4,403,365 A      9/1983  Hanson
(Continued)

FOREIGN PATENT DOCUMENTS

CN       106734001 A  *  5/2017  ............... B08B 9/30
DE         4229612 A1 *  3/1994  ............... B08B 1/00
(Continued)

*Primary Examiner* — Laura C Guidotti
(74) *Attorney, Agent, or Firm* — Tangent Law Group, PLLC; Eric J. Weierstall, Esq.

(57) ABSTRACT

The invention relates to an improved system, device and method for optimized, high volume cleaning of pans, related brush modules, and methods of operating and processing same A pan cleaning system having one or more modular swing arms for cleaning a flow of pans is provided. The system having a frame with a mounting point for each of the modular swing arms and the swing arm pivots about a pivoting element freely motivated by a swing arm actuator and controlled with a swing arm limiter coupled to one or more controllers. The modular swing arm is positioned by the one or more controllers by activating the swing arm actuator to position and to engage a dirty pan from the flow of pans at a pressure range exerted by the actuator and limited by the swing arm limiter such that the pan is cleaned. On one of the modular swing arms, a cleaning module mounting a staggered set of two or more brush heads is provided in offset rows provides overlap during cleaning to overcome compression issues in the brush heads during movement of the pan. Each of the brush heads also having bristles specifically spaced and angled so that they provide consistent contact without laying over one another when compression does occur. Each of the brush heads also rotating so that the rotational moments of each of the brush heads in the two or more brush heads is offset by the equal or paired rotating brush heads. Finally, the controller is
(Continued)

provided so that it can sense numerous conditions in the cleaning process, including things like pan height, pan type, the amount of contaminants on the pan, the size of the pan, how much agitation or pressure to apply to the pan, when the pan is passing the cleaning module, whether a jam may be occurring under the module, and similar variables during the cleaning process.

22 Claims, 29 Drawing Sheets

Related U.S. Application Data continuation of application No. 17/009,566, filed on Sep. 1, 2020.

(60) Provisional application No. 63/033,826, filed on Jun. 2, 2020, provisional application No. 62/894,915, filed on Sep. 2, 2019, provisional application No. 62/894,923, filed on Sep. 2, 2019.

(51) Int. Cl.
*A46B 13/02* (2006.01)
*A47L 15/24* (2006.01)
*A47L 15/39* (2006.01)
*A47L 15/42* (2006.01)
*A46B 9/02* (2006.01)
*A47L 15/46* (2006.01)
*B65G 17/12* (2006.01)

(52) U.S. Cl.
CPC ............ *A47L 15/241* (2013.01); *A47L 15/39* (2013.01); *A47L 15/4295* (2013.01); *A46B 9/026* (2013.01); *A46B 13/02* (2013.01); *A46B 2200/3013* (2013.01); *A47L 15/4282* (2013.01); *A47L 15/46* (2013.01); *A47L 2401/04* (2013.01); *A47L 2401/17* (2013.01); *A47L 2501/20* (2013.01); *A47L 2501/24* (2013.01); *B65G 17/12* (2013.01)

(58) Field of Classification Search
USPC ........................................ 15/88.2, 60, 56, 77
See application file for complete search history.

(56) References Cited

U.S. PATENT DOCUMENTS

| | | | | |
|---|---|---|---|---|
| 4,993,096 | A * | 2/1991 | D'Amato | B23Q 15/12 |
| | | | | 451/21 |
| 5,239,722 | A * | 8/1993 | Hanson | A46B 13/02 |
| | | | | 15/56 |
| 5,531,832 | A | 7/1996 | McCalip | |
| 2007/0042139 | A1 | 2/2007 | Cooper | |
| 2013/0342824 | A1 | 12/2013 | Ponornarev | |
| 2015/0081090 | A1 | 3/2015 | Dong | |
| 2019/0234617 | A1 | 8/2019 | Bhogal | |
| 2020/0048009 | A1 | 2/2020 | Moore | |
| 2021/0121041 | A1 | 4/2021 | Schmidt et al. | |
| 2021/0125326 | A1 | 4/2021 | Schmidt et al. | |
| 2021/0169303 | A1 | 4/2021 | Schmidt et al. | |
| 2021/0149312 | A1 | 5/2021 | Tel | |

FOREIGN PATENT DOCUMENTS

| | | | | |
|---|---|---|---|---|
| JP | 2015-084671 | | 5/2017 | |
| KR | 101651193 B1 | * | 8/2016 | ......... A47L 15/0076 |

* cited by examiner

PAN CLEANING BRUSH MODULE, CONTROLLER AND METHODS OF SAME

CROSS-REFERENCE TO RELATED APPLICATIONS

This application claims benefit of the priority of U.S. provisional patent application 63/033,826 filed Jun. 2, 2020, as well as the benefit of priority from U.S. Utility application Ser. No. 17/009,203 filed Sep. 1, 2020 which claims benefit of priority from the 63/033,826 and U.S. Provisional Application 62/894,923, filed Sep. 2, 2019, and U.S. Utility application Ser. No. 17/009,566 filed Sep. 1, 2020 which claims benefit of priority from U.S. Provisional 62/894,915 filed Sep. 2, 2019, all of which are incorporated herein by reference.

FIELD OF THE INVENTION

The invention relates to an improved system, device and method for optimized, high volume cleaning of pans, related brush modules and methods of operating and processing the same.

BACKGROUND OF THE INVENTION

There are often products such as hamburger buns that are baked in pans that will, for appeal and flavor enhancement purposes, often receive application of things like, but certainly not limited to, seeds that can include but are certainly not limited to sesame seeds, sunflower seeds, cracked grains and the like to the top surface of the bun. Often a glaze will be sprayed on or in addition to the seeds or materials previously listed to aid with adherence to the final product. This can create issues where, for example, the sesame seeds can bond to the upper surface of the pan or at the transition point where the top surface transitions to the pockets of the pan, the pocket being where the bun dough portion gets placed for proofing and baking. When this happens and on the first baking the seeds will go to a golden color and generally be harmless to the finished product. However, if these seeds are not removed and the pan goes thru the oven a second or third time with the original seeds, the original seeds will become dark brown if not black and become a potential contaminant. If these seeds are not removed before subsequent proofings, the dough portion would be dropped to proof over the blackened seeds. The seeds can then become bonded to the dough and after baking and depanning the seeds can be bonded to the final product, the baked bun. To a consumer this burnt black piece can be very undesirable. The blackened seeds are then contaminants and create serious issues in appearance in addition to causing issues if accidentally ingested in the final product potentially for some users.

Existing pan cleaners are typically very unsophisticated affairs, generally providing too much agitation, prematurely wearing the pans non-stick coatings, or inadequately reaching the entirety of the pan. These conventional or prior art pan cleaners can be very limited as to where or what surfaces they can clean. It would be desirable to reach all the corners and surfaces of the pan, something the commercially available conventional machines do not do well. It is often difficult for these devices to reach certain locations. Specifically, for example, it is necessary that mechanical cleaning include the upper inner perimeter of the pan which gives the pan rigidity as well as provides a means for it to nest one into another when it is to be stacked but is often missed with existing cleaners. Effective cleaning here would prevent the aforementioned adhesion of contaminant seeds and/or overspray of the associated adhesion materials. Additionally, providing the ability to apply the proper pressure on the pans whilst cleaning and to detect jams and similar operating issues would be desirable.

If there is sprayed on glaze and/or the pan has seeds adhering to this overglazed surface, it can be the case that the pans can then be taken away from where the product gets baked for stacking/unstacking operations. But during the stacking and/or the unstacking operation and/or the movement of the pans when stacked it is possible that the inner lip of the pan will contact or may contact the outer perimeter lip of the pan that is above and nested into the lower pan in a stacking operation. When this happens materials that are bonded to the inner and outer pan perimeter can be dislodged thru the impact imparted by nesting or stacking operations and/or when the pans in stacks are moved around. Dislodging of these materials can present a hazard in that the dislodged material can go into a bun pocket or onto an upper pan surface where the dough can fall and/or proof. The resulting bun would then proof onto the dislodged contaminant resulting in the same issue of the contaminant appearing on the final bun.

The retention of these contaminants is an issue and a concern, and a need exists to alleviate these possible sources of product contamination through more efficient and optimized brushing processes and devices. There exists a need for a stronger means of cleaning pans, including but not limited to bun pans.

SUMMARY OF THE INVENTION

An aspect of the invention is to provide better, more optimized cleaning of multiple surfaces on pans, in continuous production where pans are in good condition and a light cleaning is required on each pass thru the baking process.

A further aspect of the invention is to provide for cleaning of protein glaze that is not hard bonded or seeds that are slightly adhered to the pan where a consistent minor or light to medium cleaning is sufficient and the brushes can be mild so that wear imparted to the release non-stick coating in the cleaning process is not significant.

A further aspect is to provide perimeter cleaning such that when pans start to get a build up occurring or where a pan perimeter cleaning is required then an additional or alternate brush can be used which will clean these surfaces and the brush action will be more significant to do a stronger cleaning operation.

A still further aspect of the invention is to provide a modular system and with easily maintained and detached brush heads to address allergen concerns where brushes used with allergens cannot be used on non-allergen pans. This includes providing extra brushes or alternate brushes and/or extra brushes mounted to additional cleaning modules that can be activated to come in or be removed from the cleaning operation so as to use the corresponding cleaning devices only with the corresponding allergen or non-allergen products.

Yet another aspect of the invention is to provide the aforementioned brush change options via a controller having stored recipes so that no human intervention is required and the alternating or selective use of given modules can be engaged via the controller without human intervention or further change outs.

An aspect of the invention is to provide for continuous pass thru of pans to be cleaned such that as pans come in, they will be cleaned regardless of spacing or location on an infeed conveyor belt which removes the issue of indexing of pans to required locations.

Yet another aspect of the invention is to provide a sensor to sort the pans requiring cleaning from those not requiring cleaning and if the pans do not require any cleaning the cleaning heads of the instant invention can be activated to lift off from the path of pans and the pans just pass thru without any brush contact. This may also be the case where pans that do not get seeds and/or glaze applied may just run thru the pan cleaner, but the cleaning modules may be raised and operation to the modules may turned off so as to not provide any cleaning.

A still further aspect of the instant invention is to provide at least one swing arm configured on an at least one frame whereby the swing arm can extend in a controlled fashion to the level needed to proceed.

Another aspect of the invention is the provision of a customer customizable number of cleaning stations to be used or required for specified operation.

Yet a further aspect of the invention is the settable height of the arms, which allows setting of lowest allowable workable position for the arm but does not make it a fixed setting where jams of the pans can wedge in one or more pans, but rather a minimum height and the head mounted on the arm can float higher to allow for pass over of pan perimeter edge or in the as previously indicated typical pan wedge situations.

An aspect of the invention is a controller that controls the aforementioned arms, so that the arms can be adjusted and thereby adjust the downward force of the brush to the pan by electronic means so as to allow for recipe driven, minimal settings and or operation.

A still further aspect of the invention is easy fast change out of brushes with quick change connectors which allow operations to change out brushes at a settable count level so that as an example brushes may be changed out at regular pan cleaning cycles to allow for cleaning of brushes so that the brushes are actually cleaning the pans and not allowing the brushes to get saturated to where they are spreading debris from prior pans onto subsequent pans cleaning cycles.

Yet a further aspect of the invention reverses operation of the brushes, such that when the horizontal axis cylindrical brushes are used, they will tend to bend the bristles and it may be that the bristles will deform or bend to a degree of bend or curvature that reduces the cleaning action from brushing to stroking the pan surface. Optimally, these brushes can be reversed so as to always utilize bristles that are forward inclined to brush the pan surface. For example, if a bristle gets bent back during operation and so when re-installed after cleaning or when programmed to be reversed on an operational count basis then when it is installed in the reverse manner it will be where the bristles are forward inclined and push brush the pan surface rather than drag over the pan surface which is what happens. This procedure or available program option will also provide better brush utilization, operation, and life span.

The apparatus of the invention includes a modular swing arm for cleaning an at least one pan having an at least one swing arm mounting point with the modular swing arm coupled thereto such that the swing arm rotates freely about a pivot element. The modular swing arm being moved by an at least one swing arm actuator with an at least one swing arm limiter limiting the movement and an at least one controller controlling the movement. Where the at least one modular swing arm is positioned by the at least one controller by activating the at least one swing arm actuator to position to engage the at least one pan at a pressure range exerted by the at least one swing arm actuator and limited by the at least one swing arm limiter such that the at least one pan is cleaned.

The at least one controller can be further adapted to sense pressure on the at least one modular swing arm. The pressure is sensed through the at least one swing arm limiter. Whereas part of the sensed pressure, both a down force and up force relative to the at least one swing arms extension are measured by the at least one controller. The controller is further adapted to extend the swing arm about its pivot element to apply the downward force and sense a jam condition wherein the upward force exceeds a pre-set limit in the at least one controller and the at least one controller retracts when the present limit is exceeded as an indicator of a jammed pan stuck under the swing arm.

The apparatus of the invention also includes a rotary brush module in a pan cleaning machine. The mounting plate is coupled to a drive system with at least two brushes coupled to the mounting plate and spaced thereon so as to provide overlap in a line of travel for each of the at least two brushes with respect to the other brushes over a pan within the pan cleaning machine. With at least one shaft extending from each of the at least two brushes through the mounting plate and coupling to the drive system such that the at least one shaft on each brush of the at least two brushes is driven and spins the at least two brushes. An at least one brush element extends from the at least one brush shaft, the at least one brush element having a plurality of bristles that deform on contact with a pan including the inner perimeter of a pan and clean the pan along the path of movement of the at least two brushes such that the overlap in the spacing of the at least two brushes on the path compensates for the deformation of the plurality of bristles in cleaning the pan and maximizes the probability of contact of the bristles with the pan along the path of movement of each of the at least two brushes.

The rotary brush module can further have an overlap path that covers the deformation to leave no gap of uncleaned area on the pan. The at least two brushes can further comprise a first of the at least two brushes and a second of the at least two brushes. The spacing of the at least two brushes can be staggered in at least two rows, a first row of the at least two rows having the first of the at least two brushes and a second row of the at least two rows having the second of the at least two brushes, the respective brushes and rows forming the staggered overlap width. The staggered overlap width can be between about one hundred and two hundred percent based on one half of the center on center shaft distance of the brush body. The staggered overlap can be about two hundred percent of the width of the first of the at least two brushes. The staggered overlap width for the spacing can be one-half of the center to center distance of the brush shafts.

The first of the at least two brushes can rotate clockwise and the second of the at least two brushes can rotate opposite the first or counter clockwise. The plurality of bristles further comprises an at least one inner bristle and an at least one outer bristle relative to the at least one shaft each bristle extending at an inner bristle angle and an outer bristle angle respectively from the brush body. The inner bristle angle can be between about 15 to about 45 degrees relative to a perpendicular plane extending from the brush body. The inner bristle angle can be 15 degrees. The outer bristle angle can between about 15 to about 45 degrees relative to a perpendicular plane extending from the brush body. The inner bristle angle can be 25 degrees.

The at least two brushes each can further comprise a brush mounting plate, an upper cartridge coupled to the mounting plate drive system through a pulley member and having the at least one shaft being rotatably passed therein, a lower cartridge, a cartridge fastener coupling the lower cartridge to the at least one spindle, a brush body having at least one bristle extending therefrom, and a detachable coupling button detachably coupling the brush body to the lower cartridge.

The apparatus of the invention further includes a control system controlling a pan cleaning machine, including a pan cleaning controller with an at least one sensor coupled to the pan cleaning machine and communicating with the controller and an at least one actuator. Where the at least one actuator is activated by the pan cleaning controller based on input received by the at least one sensor from an at least on sensor on the pan cleaning machine and which controls the position of an at least one modular swing arm in the pan cleaning machine and bring an at least one cleaning module mounted thereto into contact with a pan in the pan cleaning machine to clean the pan.

The at least one sensor can sense the relative position of the at least one modular swing arm in relation to the pan being cleaned. The position of the at least one module swing arm can be set in the pan cleaning controller to a position for applying a pre-programmed downward force at a starting position and the at least one sensor senses both the applied downward force and feedback returned from the contact of the at least one cleaning module coupled to the at least one modular swing arm as it is being applied to the pan during cleaning. The controller can be adapted to read the downward force and the corresponding feedback returned from the contact of the at least one cleaning module so as to sense a condition on the at least one cleaning module corresponding to a jammed condition whereby the pan is jammed under the module and the controller is further adapted upon sensing such a condition to raise the at least one cleaning module.

The at least one actuator can further comprise an at least one pneumatic cylinder and an at least one stroke limit control element which are each coupled to a machine frame. The at least one stroke control limit element can be coupled to the at least one swing arm through an at least one a pin traveling in a slot in a guide plate and the at least one stroke limit control element is adapted to limit the movement of the at least one swing arm by stopping the movement of the at least one swing arm when the pin reaches the end of the slot in the guide plate and an at least one sensor is coupled to and senses the location of the pin and thereby control the position of the at least one swing arm.

The at least one senor can be at least one of an optical sensor, a magnetic, a mechanical, and a strain-type sensor. The at least one sensor can further comprise at least one sensor detecting the height of the pan. The controller can be adapted to adjust the distance of the at least one cleaning module from the pan at a specific vertical height spacing sensed by the at least one sensor detecting the height of the pan. The at least one sensor can further comprise at least one sensor detecting the style of pan and the controller is adapted based on the detected pan style a pre-programmed cleaning routine. The pans can be coded and the at least one sensor further comprises a code reader. The at least one sensor detecting the style of the pan can be an at least one optical scanner.

The controller through the at least one sensor can be adapted to measuring at least one variable in the cleaning system. The at least one variable includes at least one of the pan height, a pressure on the cleaning module, and the weight of the pan. The controller based on the at least one variable can be adapted to adjust the at least one cleaning module to a pre-programmed cleaning routine on the controller and the module swing arm moved according to the pre-programmed cleaning routine.

Moreover, the above aspects and advantages of the invention are illustrative, and not exhaustive, of those which can be achieved by the invention. Thus, these and other aspects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE EXEMPLARY EMBODIMENTS OF THE FIGURES

Figure 1:
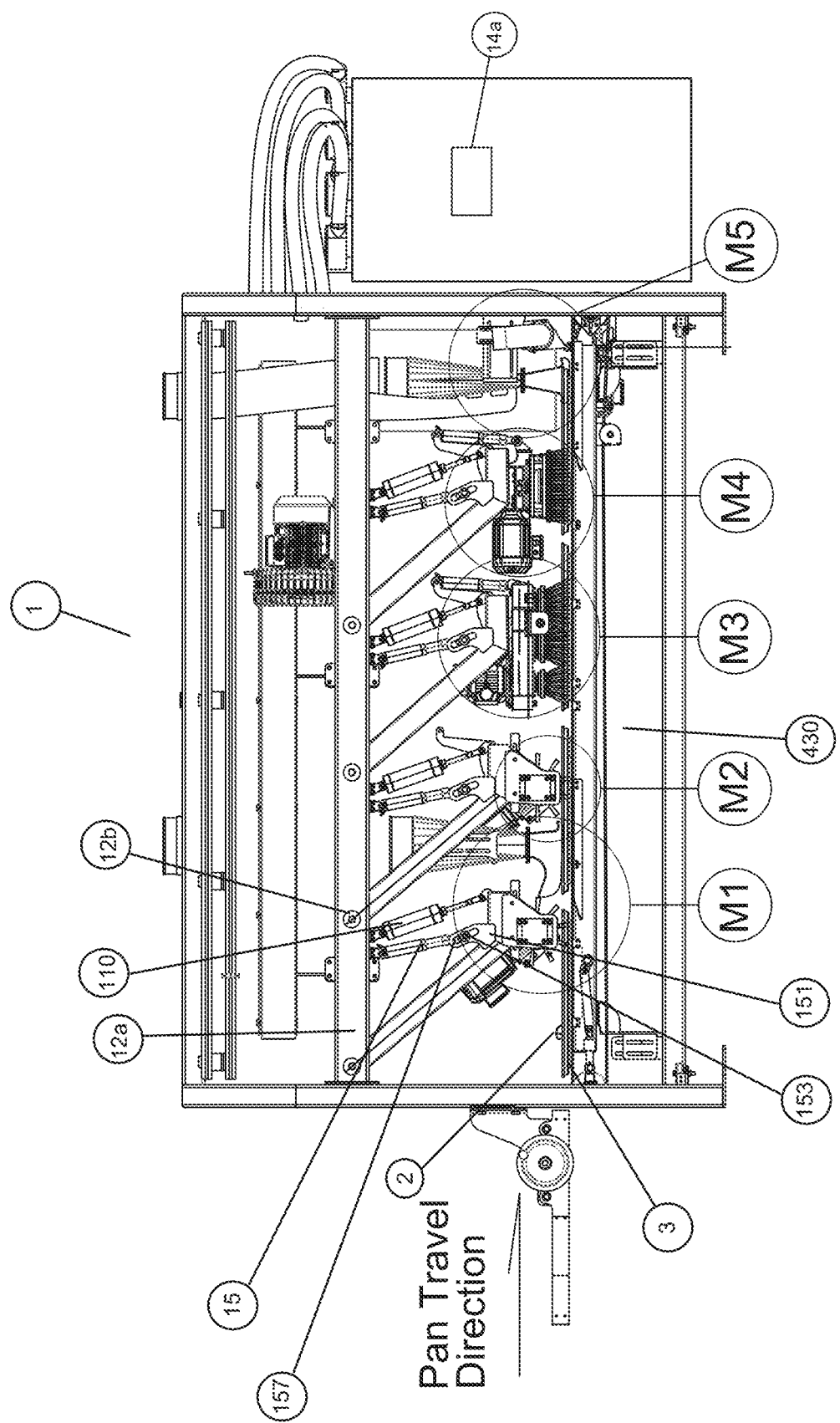
FIG. 1 shows a side view that illustrates the main structure of an exemplary embodiment of the instant invention mounting modules one through five within the direction of pan feed.

There are often products baked in pans that will for appeal and flavor enhancement often receive application of toppings like glazes and seeds, as previously noted. This can create issues where, for example, the seeds bond to the pan and are retained through baking cycles. As noted above, the resulting blackened seeds are then contaminants and create serious issues in appearance in addition to causing issues if accidentally ingested in the final product potentially for some users. Moreover, as discussed, existing pan cleaner systems are generally very unsophisticated affairs, often providing too much agitation, prematurely wearing the pans non-stick coatings, or inadequately reaching the entirety of the pan. These conventional or prior art pan cleaners can be very limited as to where or what surfaces they can clean and lack the ability to apply the proper pressure on the pans whilst cleaning and fail to detect jams and similar operating issues creating production delays and problems. The instant invention relates to an improved system, device and method for optimized, high volume cleaning of pans, related brush modules and methods of operating and processing the same.

One non-limiting example being a machine and process for cleaning bun pans as referenced throughout herein which are used in the production of hamburger and other dough type buns, these being non-limiting examples of the types of products that can be produced. The pan cleaning system is required to brush the surface of said pans so as to clear the top and/or pocket surfaces of the pans of debris deposited in the production of the buns and/or in the application of toppings. The toppings can include but are not limited to seeds, for instance but not limited to sesame or sunflower seeds, or grain mediums, such as but not limited to cracked and or whole grains, and top coatings, such as but not limited to glazes such as in the use of protein washes or sprayed on glazes. Though references herein are made in relation to such a machine, method and pan/bun product, the instant invention can likewise be adapted for many bakery applications and can include as non-limiting examples buns, pastries, breads, bread-like products and the like without departing from the spirit of the invention. The exemplary embodiment regarding buns herein described as buns or hamburger buns is intended as a non-limiting exemplary embodiment for illustration of the invention.

When producing such products there is an element of risk that some or all of these materials may bond to the top surface 4 of the pan 3 and or into the pocket 5 of pan 3. If these materials, then get bonded to any of the surfaces or subsequent product made or baked in such a pan 3 then it may have significant adverse effects such as but not limited to allergen reactions to toppings like seed products to visual abnormalities that can result in rejection of the baked bun due to adhesion of burnt seeds that have gone thru repeated baking cycles.

To clean the pan surfaces, typically brushing is used. In large scale bakery installations, the pans can typically run up in size, for instance but are certainly not limited to, about forty-eight inches by forty-eight inches in size. The pans 3 are typically coming out of the oven at rates as high as forty pans per minute or more. So, at these operating speeds, there is only around one and a half seconds to clean a pan 3 and therefore mechanical, commercial scale brushing is the most rapid and economical cleaning process that can be applied. Water washing, even if in an automated application, takes too long and most glazes used in this process are silicon based which is resistant to water. Additionally, the use of water on the silicon non-stick coating of the pans decreases the number of cycles in the useful life of the non-stick coating of the pans. To get the pans 3 clean from the specified contaminants in the allotted time the brushes must have the cleaning action required and be able to contact and clean all of the areas required to be cleaned on the pan 3 in a very short period of time. The instant invention is optimized to provide the efficient cleaning and adjustable and/or selective contact with the pan 3 to accomplish this cleaning. Additionally, the instant invention provides for quicker change outs when needed, reduced maintenance down time, and greater adaptability for use in customer production lines.

FIG. 1 shows a side view that illustrates the main structure of an exemplary embodiment of the instant invention mounting modules one through five within the direction of pan feed. FIG. 1 illustrates the main structure of an exemplary embodiment of the instant invention mounting modules one through five (m1-m5) within the direction of the feed of the pans 3. The figure shows the frame 12, a conveyor housing or frame member 12a with module hinge points 12b to attach swing arms 11 or the housing 12a to the frame 12 and thereby engage the cleaning sub-systems which are referred to herein as modules one thru five (m1-m5) for the non-limiting purpose of describing an exemplary embodiment of the invention. The swing arms 11 allow the working components of the modules (m1-m5) to contact the pans 3 as well as execute the various aspects of the cleaning steps of the pan cleaner 1 and control of the system. In the exemplary embodiment shown, only modules one thru five (m1-m5) are shown but it is understood that in further exemplary embodiments the machine can accommodate greater or fewer modules within the frame 12 without departing from the spirit of the invention. All modules are suspended from the frame member 12a as shown in FIG. 1 at hinge points 12b on swing arms 11 that can articulate or hinge upon or from and thereby move the modules in similar fashion. The hinge point 12b allows for the rotatable or hinging attachment of the module mount arms 11 and the ability to "float" in the space above the conveyor 430. Alternative or additional elements beyond the modules can also be added in further exemplary embodiments, these can include for instance machine sensing sub-systems, diverter conveyors and similar devices and aspects disclosed in applicants co-pending U.S. patent application Ser. No. 17/010,260 directed to a pan visualization and scanning system and Ser. Nos. 17/009,566 and 17/009,203 directed to pan cleaning systems, as discussed herein.

In the process of cleaning pans 3, the pans 3 enter on the indicated entry side of the pan cleaning machine 1. There they encounter pan conveyor 430 having conveyor belts 46 which carry pans 3 and move along a conveyor frame 43 with support surfaces 44, as further shown in FIGS. 22a-22d. This style of conveyor 430 accepts the pans as they are presented to the pan cleaner machine 1 and loads them on to the supported surface 44 and thru the pan cleaner machine 1. The pans 3 do not need to be loaded and indexed onto carriers or to specific locations as in our other devices and applications. Thus, the exemplary embodiment shown operates on the pans 3 as presented in whatever random sequence and will accept the pans 3 and convey them to the entrance of the machine in a consistent manner. A consistent time delay is maintained for each pan 3 due to the time required to pass the pan 3 through the pan cleaner 1. This separation is provided by the speed of the conveyor belt 46, which is greater than the product of the time required for a pan 3 to pass thru the pan cleaner 1 times the number of pans 3 presented to the cleaner 1 in a given amount of time, e.g., rate of flow of the pans. For example, if the pan length is three feet times thirty pans per minute, then the conveyor belt speed must be greater than ninety feet per minute, such that they will arrive at specific locations or modules for cleaning at specific times etc.

As the conveyor belts 46 move along the conveyor belt frame 43 and supports 44 they are guided by pan conveyor belt guides 45 to ensure that the conveyor belts 46 stay aligned on the conveyor frame supports 44 and do not move laterally. The pan or bun pan 3 will typically, but not always, engage a second stage of cleaning which is provided in the exemplary embodiment shown at module three, as more clearly shown and described in relation to FIGS. 4-17c, which is the rotary brush unit where vertical spindles 21 have improved rotary brushes 25 attached that will clean the top surface of the pan 3 as well as the inside pan perimeter 6 and outside pan perimeter 7 surface of the pan 3. A final cleaning follows at modules four and five (m4, m5), which are further shown in FIGS. 18-19, providing an orbital brush engaging the pan and a second vacuum hood 41, before passing the pan to the exit side of the pan cleaning machine 1.

As noted, swing arms 11 can pivot on swing arm pivot or hinge point 12b to move the cleaning mechanism or module towards or away from the pans 3 moving through the pan cleaning machine 1. In the exemplary embodiment shown the support structure of the frame 12 is designed so that the rotating brushes are lowered and engaged with the surface of the pans 3 from above the pan top surfaces 4. The mounting arms 11 are articulated by a movement actuator system 14 controlled by the controller 14A. Though the swing arms 11 generally raise and lower the modules (m1-m5) in a fashion to maintain a parallel facing of the module and the pan, this is not a limitation of the system and co-pending U.S. application Ser. No. 17/009,566 describes a version whereby the conveyor and the modules are rotated relative to the horizontal of the frame.

The movement actuator system 14 has several components for each swing arm 11 and module. A movement stop actuator 15 sets or is moved electrically so as to give or provide a positive stop position to where the swing arm 11 can be lowered a minimum declination or lowered operating point. The swing arms 11, the conveyor 430, and the movement of the modules (m1-m5) are controlled by a controller 14a which receives information from the modules (m1-m5), the arms 11, sensors and the movement actuator system 14. There are components that are used in the raising and lowering of the elements of the individual modules as well as in assigning and causing the module to stop in its required heights and communicating same to the controller. These components are common to all modules.

The movement of swing arms 11 can be controlled by an actuator 110, which can be for example but is certainly not limited to a pneumatic cylinder as shown or any other type of actuator that provides reciprocating motion, for example, mechanical screw actuators or hydraulic actuators. For bakery applications, if a seal breaks a benefit of pneumatic cylinder actuators is that it will mainly release air so the surrounding area will not be contaminated. However, with pneumatic cylinders it can be difficult to control the movement of swing arms 11 to intermediate positions, so stroke limit controller or movement stop actuator 15 is connected to machine frame 12 and to swing arm 11 through a pin traveling in a slot in guide plate 155, and stroke limit controller 15 is operable to limit the movement of swing arm 11 by stopping the movement of swing arm 11 when the pin 153 reaches the end of the slot 157 in guide plate 155. Stroke limit controller 15 can be for instance but is not limited to a linear indexing cylinder that can retract and extend to preset or adjustable values under electric control.

For example, when cleaning flat baking pans the stroke limit controller 15 is set in a position to allow the greatest movement towards the conveyor 470 and pans 3, and when deeper baking pans are being cleaned the stroke limit controller 15 is set in a position that keeps rotating brushes in the modules (m1-m5) at the correct height above the pans so that the pans 3 can pass under the cleaning modules (m1-m5) without becoming jammed and without exerting excess forces and bending brush bristles beyond their elastic limits. The slot 157 in guide plate 155 allows actuator 110 to move the modules towards and away from pans 1 to engage or disengage as described above, but when the pin 153 in the slot 157 of guide plate 155 reaches the end of the slot 157, movement is stopped. As shown, for example, in FIG. 1 the support structure or frame 12 for the cleaning mechanisms have a swing arm 11 on each side and each swing arm 11 has respective actuator 110, stroke limit controller 15 and guide plate 155.

In some embodiments the swing arm assembly can be designed with some "play" so that the swing arm 11 is not held rigidly to the preset position but allowed to vary slightly. For example, springs or a pressure release valve from the actuator can be used to allow some movement from the preset position set by the actuator system 14 and limited by the limit controller 15 when a warped, bent or otherwise taller pan is fed to the pan cleaning machine 1. Once the taller pan has passed through the cleaning mechanism it can be automatically restored to its preset position by the actuator system 14 and the controller 14a. As noted, the stroke limit controller 15 can be for instance but is not limited to a linear indexing cylinder that can retract and extend to preset or adjustable values under electric control. It can also include an at least one sensor (not shown) to indicate the position of the swing arm 11. The at least one sensor (not shown) can be coupled to the controller 14a as described further herein below.

Thus, in the exemplary embodiment of FIG. 1, the controller 14a is used with and coupled to control the position of the arms 11 as described. The controller 14a allows for a set position for a relative lowest point and conversely highest point that the cleaning module can extend to is made available and programmed for the machine using the actuator system 14 and stroke limiter or stop actuator 15 described. The movement stop actuator or stroke limiter 15 reads or measures its relative position, provides output to the controller 14a, and controls the movement so as to provide the correct stop height. In this instance, the height adjustment system or movement actuator system 14 is shown as, but is certainly not limited to, an air cylinder system here shown as two air cylinders. The air cylinder is shown as actuator 110 and provides the movement to the actuator system 14 which uses it to extend and retract the module arm 11 to provide a variable degree of pressure on pans 3 by extending toward the conveyor 430. The stop limiter 15 extends the extension and retraction stop points and the actuator system 14 moves the swing arm 11 and thereby the modules (m1-m5) within these limits.

The disclosed pan cleaning machine 1 in further exemplary embodiments can further comprise a plurality of sensors that collect information that the control system 14a can use to automate the operation of the pan cleaning machine 1. Additional sensors can be included to detect pan and machine variables. These would include the sensors in or output from the stroke limit controller 15. The machine can also comprise sensors for detecting the type of pan that is being cleaned and the type of debris that is on the pan. If the pan is a flat baking sheet, for instance, that does not have anything that is strongly adhered to it, the machine control system can, for example, activate only one cleaning module, such as a rotating brush assembly, and automatically take other cleaning mechanisms out of service by activating actuators on respective swing arm support frames to pivot unnecessary cleaning mechanisms away from the cleaning line. There can be different cleaning requirements for different pans. The advantage of this capability is that the cleaning mechanisms not required for some pans can be removed from service, saving brushes and unnecessary wear on components and reducing power consumption.

The machine can also comprise sensors for detecting the height of the pans in the cleaning section. Since some pans are flat and some pans can have raised perimeters and/or recessed molds, not all pans have the same depth. In addition, there can be variations in depth because some pans can become warped or bent. Similarly, pans can vary by width as well. By detecting the height of the pans, the controller 14a can adjust the distance of the cleaning modules (m1-m5) from the pans 3 so that a specifically desired vertical height spacing is achieved between the pan and the cleaning mechanism. This aids in applying the proper pressure to clean the pan and assists in avoiding jamming the machine or applying too much or too little pressure on the brush bristles for cleaning. Sensors can also detect the style of pan so that the controller 14a can enable pre-programmed cleaning routines. For example, if the pan has recessed pockets, a brush plate unit can be controlled by the controller 14a to have orbital movements instead of reciprocating back and forth in a linear fashion.

Many types of sensors are known for sensing displacement and measuring components or products and the type of sensor chosen can be influenced by the application. For example, in a bakery application, where there can be a lot of dust or debris in the cleaning section, instead of an optical sensor, other types of sensors, such as magnetic or mechanical or strain-type sensors can be selected for measuring variables such as pan height, pressure on the cleaning mechanism, or weight. Alternatively, the pans 3 can be coded and the pan cleaning machine 1 can be equipped with a code reader (not shown) to determine what type of pan 3 is being cleaned so that an appropriate pre-programmed cleaning routine can be performed for that type of pan 3. The various exemplary embodiments of the pan cleaning machine of the instant invention can be fitted with sensors to perform the recited functions for the stated variables. The controller 14a can then receive the necessary information regarding the pans 3 and operating variables and execute the cleaning procedure appropriate for that pan via the logic stored in the controller or programmed via the input from a user interface (not shown). The cleaning program selected for or by the controller 14a can control, for example, which cleaning modules are activated, the distance between the cleaning modules and the pans, and the settings for the cleaning modules such as the pattern of motion and speed of motion for brushes and where the compressed air is focused and how powerful the blowing action for air knives and similar operating variables, and similar process properties.

The controller 14a of the exemplary embodiment can thus make adjustments that provide adequate downward force based on cleaning parameters and other variables. In optimizing or programming the system controller 14a, these pressures or downward forces can be dialed in or programmed so as to push down on the brushes in the module so that they can clean the pan but not so hard that the force will tend to bend or deform the bristles and instead, gently brush a surface. Or they can be applied harder to provide a different resulting cleaning actions at the pan 3. The pressure being determined by the selected cleaning parameters and programmed into the controller 14a. The goal is to provide sufficient cleaning to address concerns of removing contaminants without inherently increasing wear on the non-stick coating on the pan. Too much force often results in reduced pan life as the non-stick coating is worn by the brushes. Additionally, it is often counter intuitive, but if more aggressive cleaning and/or blowing is used it can result in blow over contamination in the pans 3 that may not have resulted from the baking process but instead from being dislodged during the aggressive cleaning. Thus, it is often times the case that a less aggressive cleaning mode is best used based on the aforementioned selectable cleaning parameters.

Thus, the exemplary embodiment of the pan cleaning system of the instant invention can adjust processing based on a desired level of cleaning, pan width, pan type, and pan shape as non-limiting examples of the improved control system. Some non-limiting examples of levels of cleaning that can be programmed can include, but are certainly not limited to, light cleaning for minimum pressure to brush the pans, medium cleaning with pockets, deep cleaning and the like and/or pass-through mode. Thus, the instant invention, in a non-limiting, exemplary embodiment, includes but is not limited to a system that provides the ability to "float" the modules and optimize the brushing to be an appropriate cleaning force to reduce wear on pans or a more aggressive brushing if heavily fouled pans or actively pass the pans without brushing if not requiring cleaning or any level in between. The pan cleaning machine 1 and controller 14a can also allow for each module to be activated or deactivated as well as raised and/or lowered to suit the needs of cleaning the pan surfaces as required. Each module can be effectively "deactivated" at any time by being raised to allow pass thru of pans that do not require cleaning by that module. Alternatively, as noted herein, a "pass through" option allows the pans to pass without cleaning, for example in instances where the pans being processed were not sprayed or topped or for a defective pan as enumerated in an alternate exemplary embodiment herein below.

These settings can be for instance, but are certainly not limited to being, programmed and stored in the controller 14a. The controller 14a can be programmed so that these parameters can be set into recipes and when the recipes are entered the movement stop actuator 15 which will move to the required location so that the mount arm 11 will only go to that point and not lower for the desired setting or recipe and force. Again, the distance and pressure applied at the pan 3 is settable a determined by engagement parameters and/or cleaning parameters programmed and read by controller 14a, these can include many parameters, a non-limiting example in the exemplary embodiment being a lowest pan position and adjustment. The engagement parameters are defined as the machine executable translation of the cleaning parameters.

Additionally, in further exemplary embodiment as an alternate implementation, the pan cleaning machine 1 can be coupled to a pan sensing system, like that disclosed in applicants U.S. Provisional Application 62/894,922, filed Sep. 2, 2019, directed to a Pan Coating Visualization Enhancement Material, Apparatus and Method incorporated herein by reference. The sensing system (not shown) can analyze the pan for anomalies indicating contaminant or foreign materials and adjust the selected setting accordingly, e.g., light for identified seeds or heavy for glaze in pan pockets. Similarly, in conjunction with a sorting conveyor, as seen in applicants U.S. Provisional Applications 62/894,923 and 62/894,915 filed on Sep. 2, 2019, which is also incorporated herein by reference, a pan which has been deemed unserviceable due to wear on its non-stick coating can simply be passed through to the sorting conveyor and removed from service.

In addition to the variable types of cleaning available with the novel arm mount system and controller system, these systems also allow for quicker, easier error correction, e.g., unjamming, when the pans 3 are not properly aligned. Typically, in the prior art, when the conveyor 470 moves the pan under fixed brush systems or systems that do not lift and then engage there is a possibility of a jam. The pans 3 can overlap or stack on the conveyor, referred to as "shingling" in the art. This overlap gets caught under a fixed height system and a wedging force is applied to the incoming pans being conveyed by the conveyor which is moving at high speed such that the line must be stopped to fix the jam—often with a crowbar. The instant invention overcomes this issue.

In the instant invention, as shown in FIGS. 7-11, when the lip of the bun pan 3 comes into the cleaning section, the cleaning head or module can float over the bun pan perimeter top surface 4 then come down to clean the lower main surface of the pan 3. It provides a "float" over aspect where if pans have been pushed together or have partially or fully shingled over top of one another the shingled pans will go into the pan cleaner 1 and the head will float over them. The cleaning brush heads will not jam, and the pans will not wedge into the pan cleaner brushes but rather the module will just float over the top of the pans. This is because unlike conventional prior art pan cleaners which are raised and lowered on threaded rods or by what may be described as positive positioning means, the instant invention instead utilizes a floating arm which has a setting for the module as a lowest position stop and then provides a targeted downward force on the module to clean the pan upper surface but allow for some float. If the pressure rises, it rises or floats. Similarly, if there is a jam for other reasons, the system can easily rectify it by detecting forces on the arms which exceed those set, for instance at the stop limiter, and raising the arms to a much higher point which provides a much quicker ability to clear for instance a misaligned pan, e.g., crooked or cockeyed, that can be misfed on the conveyor.

Thus, in relation to the overall exemplary embodiment of the pan cleaning machine 1 shown in FIG. 1, there are significant advances providing for improved operations, maintenance and efficiency in the instant invention. Each of the modules discussed herein can also be quickly mounted or demounted on swing mount arms 11 and the swing mount arms 11 elevation and active contact with the pans 3 can be controlled by a controller 14a which can raise and lower the module for height or applied cleaning force to the pan 3 and or raises or lowers modules to engage and or disengage the selected module. As mentioned, the exemplary embodiment shows five modules, a greater or lesser number of modules can be implemented by mounting on available module mount swing arms 11. Additional module mount swing arms 11 can be incorporated in extended pan cleaning machine frame members 12a to suit, providing flexibility and expandability in the pan cleaning machine 1. Turning now to the description of the first module or cleaning subsystem as shown in FIG. 2 of the exemplary embodiment which initially removes adhered product.

Figure 2:
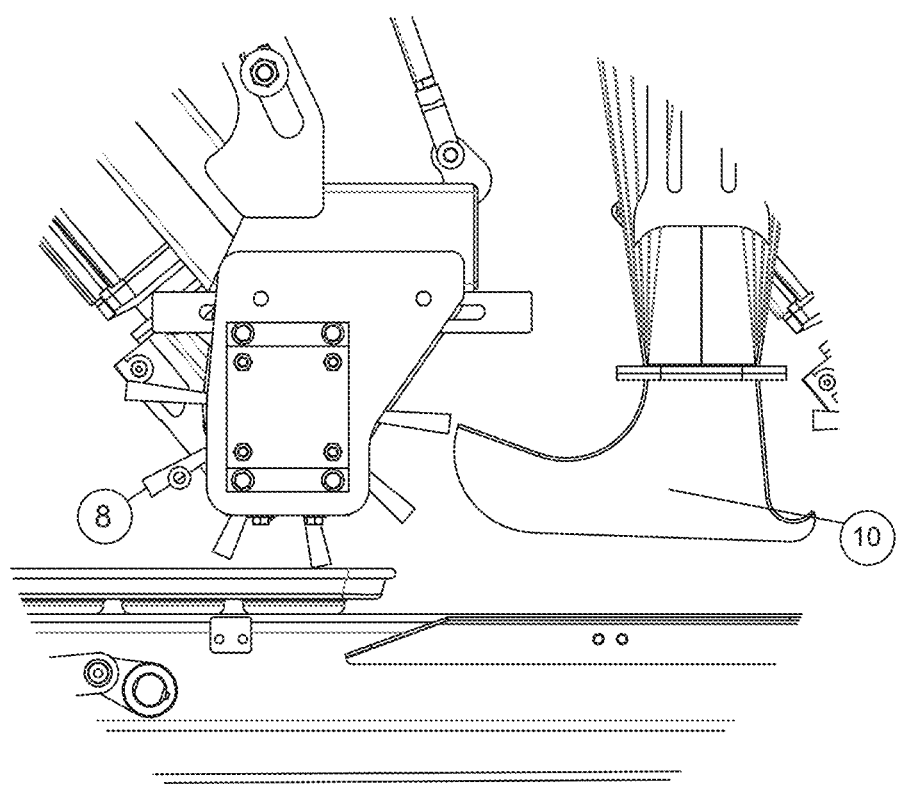
FIG. 2 shows a side view of module one of the exemplary embodiment of FIG. 1.

FIG. 2 shows a side view of module one of the exemplary embodiment of FIG. 1. Module one (m1) is a cleaning brush which is also shown in Applicant's co-pending U.S. application Ser. No. 17/009,566 and previous U.S. Provisional Application 62/894,915 filed on Sep. 2, 2019, and whose description is incorporated herein by reference. The principal task of module one (m1) in the pan cleaning machine 1 is to give the pan 3 an initial sweep from a counter clockwise rotating cylindrical brush 8 and dislodge any remaining product such as but not confined to buns 2 or partial remnants of buns that may not have been completely removed or are still adhered within the pan pocket 5 upon entry into the pan cleaner 1.

Figure 3:
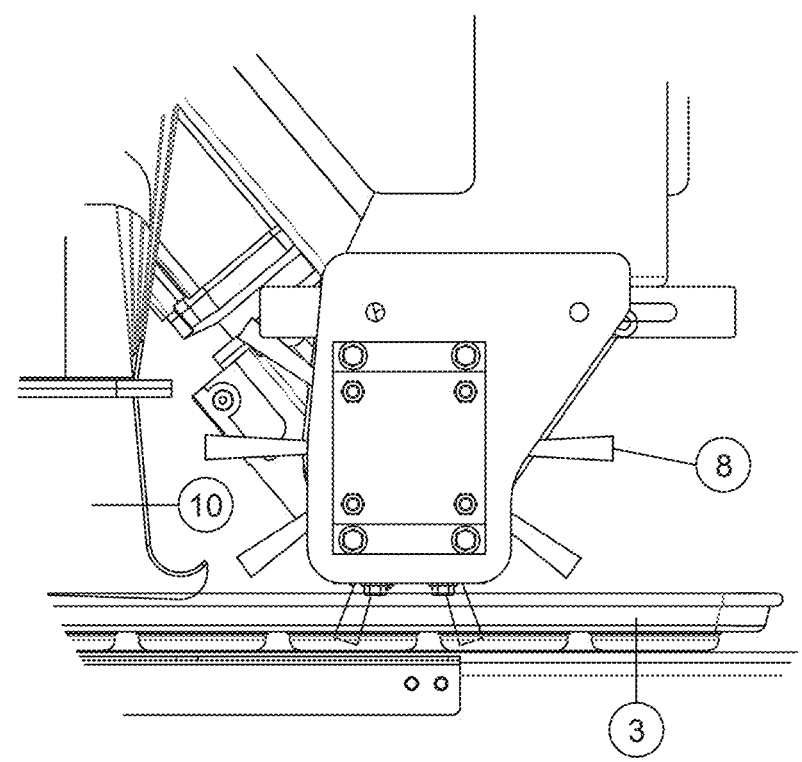
FIG. 3 shows a side view of module two of the exemplary embodiment of FIG. 1.

FIG. 3 shows a side view of module two of the exemplary embodiment of FIG. 1. Module two (m2) as shown is a combination of a reverse or mirror image of module one (m1) shown in FIG. 2 which includes an oppositely rotating cylindrical brush 8 to that shown in FIG. 2, in this case clockwise, which again aids in the task of taking off or removing buns 2 that may be adhering to bun pans 3. Module 2 (m2) includes a first vacuum hood 10. The first vacuum hood 10 is coupled to a vacuum source and can collect the removed residual buns 2 or partial remnants that are dislodged from the pans 3 from the actions of modules one and two. It should also be noted that the cylindrical brushes 8 of module two (m2) are typically rotating in a clockwise fashion to direct or motivate the residuals to the first vacuum head 10 for vacuum removal. Thus, as seen in FIGS. 2-3 these modules will remove and motivate the adhering and or residual materials or buns into the vacuum heads and away from the pan cleaning machine 1.

Figure 4:
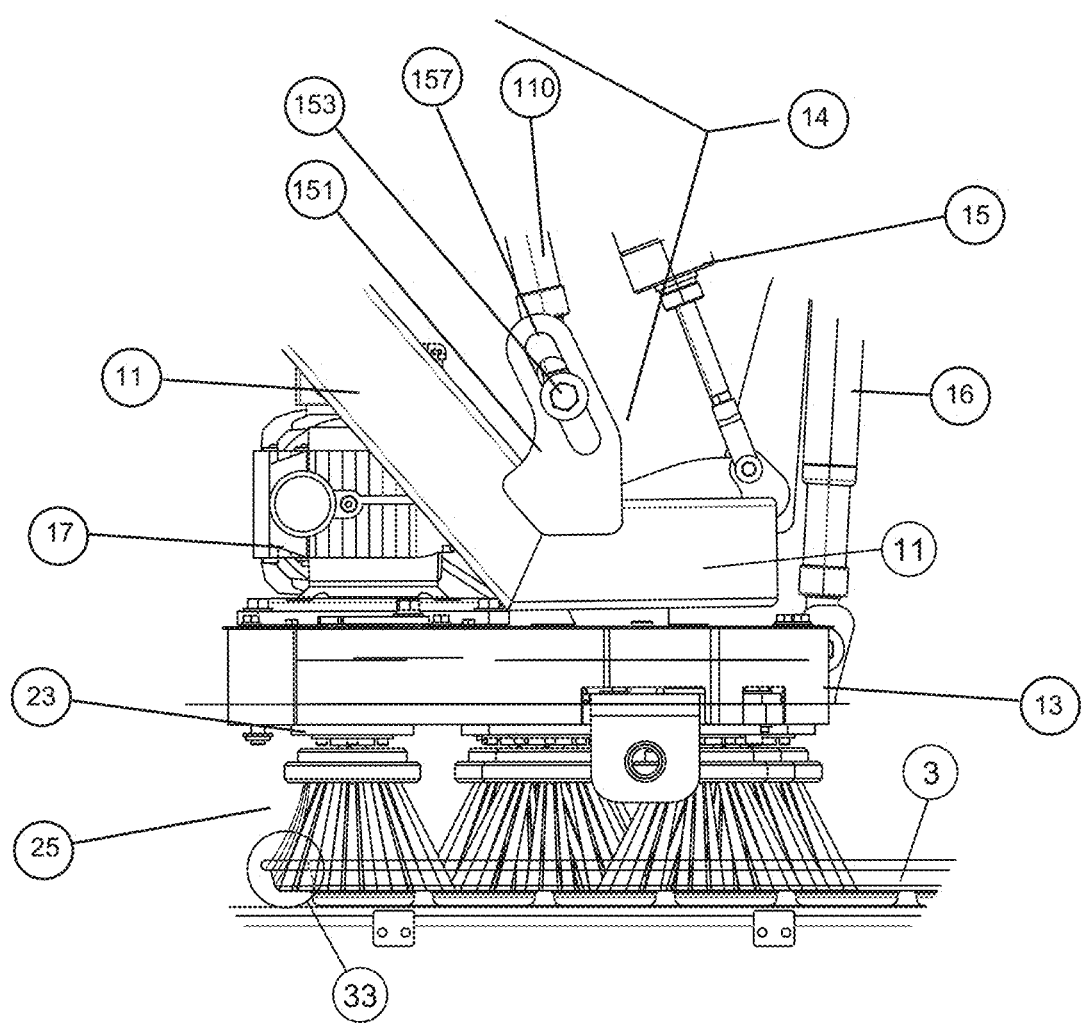
FIG. 4 shows a side view of module three of the exemplary embodiment of FIG. 1.

FIG. 4 shows a side view of module three of the exemplary embodiment of FIG. 1. Module three (m3) is an exemplary embodiment of a further cleaning brush head configuration which is improved over existing configurations and provides more optimal contact with all surfaces of the pans 3 and superior cleaning of both the main and side surfaces of the pans 3 in the instant invention. Module three (m3) utilizes a plurality of rotary brushes in a unique manner to provide improved contact of both the primary flat surface of the pan and the lip or perimeter surfaces, both inside and outside of the pans 3.

Initially it was observed that for a standard brush to strike the required surfaces it would not principally do what is required due to angle of brush bristle contact and ability of the brushes to contact all surfaces efficiently. The relative movement of the pan 3 into the brushes and the height changes at the perimeter or lip cause compression and contact issues as well. The third module (m3) and the corresponding brushes 80 are designed to address these issues. As the pan 3 passes to the third module (m3) the pan 3 approaches the rotary brushes 25 in the configuration shown and an initial deformation of the bristles occurs.

Figure 11:
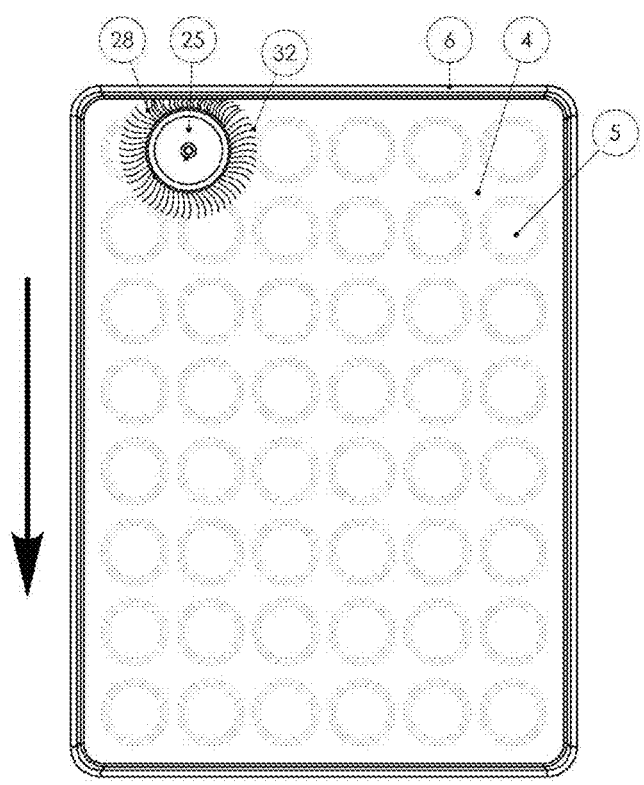
FIG. 11 shows compression of the bristles of a single brush head due to the height of the lip of the tray.

As seen in FIG. 4, as the pan 3 moves under the bristles 27, 28 as the lip of the pan 3 passes a compression of the bristles tends to reduce the effectiveness of the bristles due to the compression that occurs from the height of the lip at the inner perimeter 6 of pan 3, highlighted in the callout circle at 33 in FIG. 4. A further example of this can be more explicitly seen in FIG. 11 showing the effect on a single conventional brush head. This contact creates a reduction in efficiency at this contact point. To overcome this inefficiency the instant invention in module three (m3) provides a minimum overlap within the configuration of the brushes in module three and a more efficient brush head bristle configuration as described herein.

Figure 5:
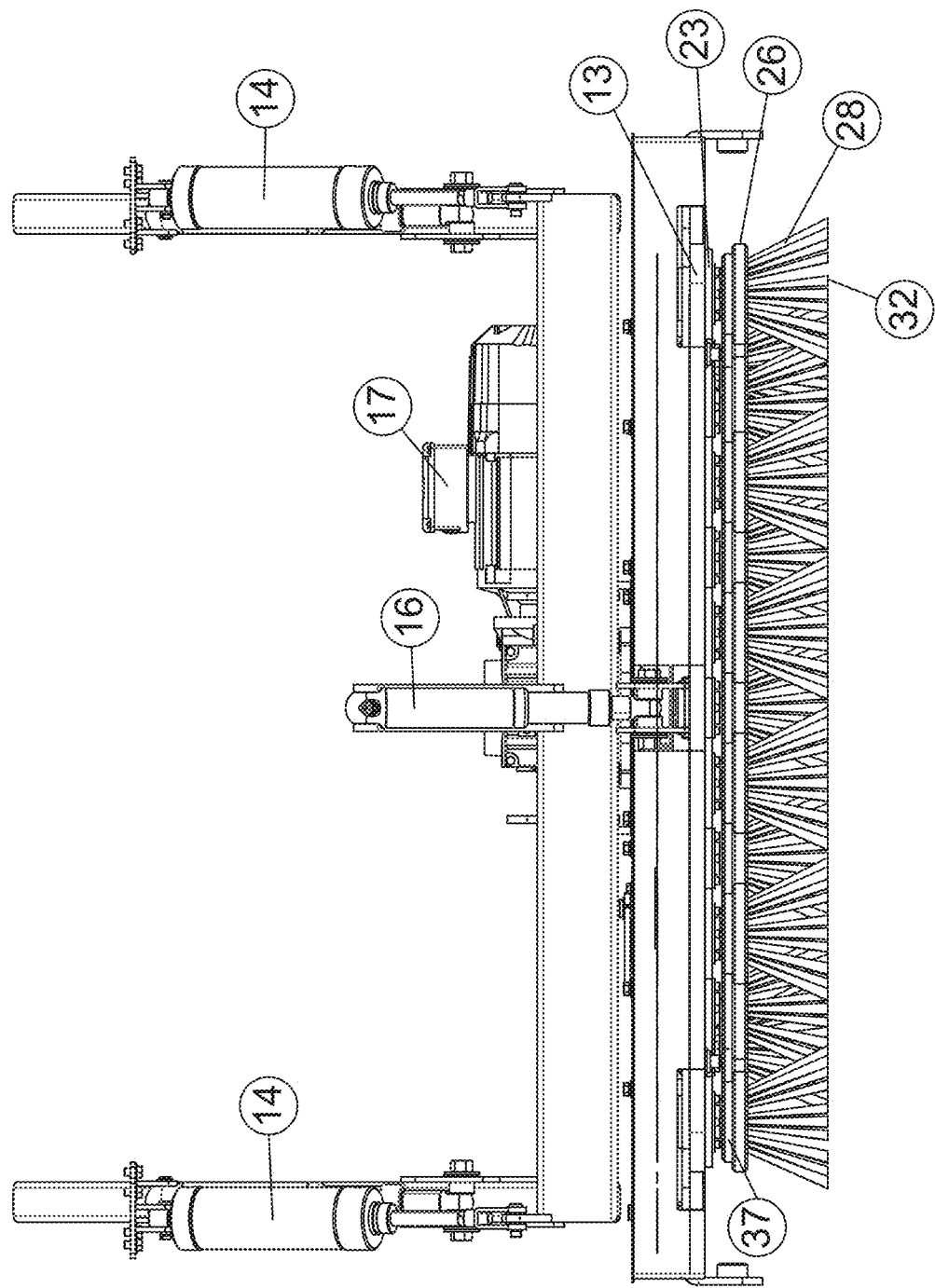
FIG. 5 shows a rear view of the exemplary embodiment of brush module three showing the dense configuration of plurality of brushes with overlap in the first and second rows of brushes.
Figure 6:
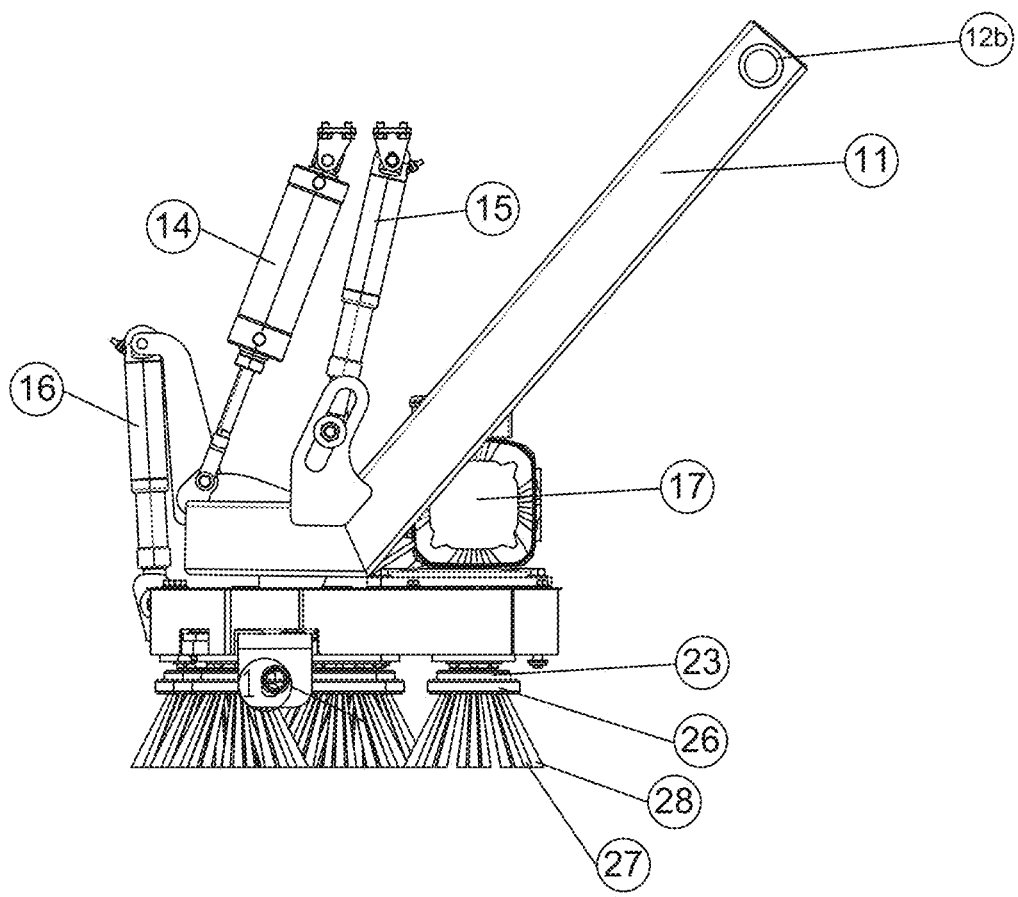
FIG. 6 shows a side view of the exemplary embodiment of brush module three shown in FIG. 5.

FIG. 5 shows a rear view of the exemplary embodiment of brush module three and FIG. 6 shows a side view of FIG. 5. FIG. 5 shows the rear view of the exemplary embodiment of the brush module showing the dense configuration of the plurality of brushes with overlap in the first and second rows of brushes. The exemplary embodiment of module three (m3) shown in FIGS. 5 and 6 comprises a main mount arm 11, which is coupled to a frame element 12a through a hinge point 12b as described above in relation to FIG. 1. As noted above, the controller 14a is used with and coupled to control the position of the arms 11 as described. The controller 14a allows for a set position for a relative lowest point and conversely highest point that the cleaning module can extend to is made available and programmed for the machine using the actuator system 14 and a stop limiter 15 as described. The pin 153 is shown traveling in the slot 157 in guide plate 155. The pin 153 is coupled to the stop limiter 15. The stop limiter 15 reads or measures its relative position, provides output to the controller 14a, and controls the swing arm 11 so as to provide the correct stop height. In this instance, the height adjustment system or movement actuator system 14 is shown as, but is certainly not limited to, an air cylinder system here shown as two air cylinders. The air cylinder is shown as actuator 110 and provides the movement actuator system 14 uses to extend and retract the module arm 11 to provide a variable degree of pressure on pans 3 by extending toward the conveyor 430. A further stop limiter or actuator is shown in the tilt leveling actuator 16, which permits the module to be tilted relative to the conveyor 430 surface and operates in a manner similar to that of the stop limiter 15 and is likewise a linear indexing cylinder in communication with the controller 14a and acting as or having sensors therein.

A drive device 17, which is shown as but is not limited to a combination electric motor and gear reducer, is mounted on a module plate 13 and drives the brushes of the module. This is done through a drive transmission system as best described in relation to FIG. 7 below. The brush heads, as seen in FIG. 5, extend from the module mount plate 13 with the lower cartridge member 23 extending below the module support frame or plate 13, a brush mounting plate 37 for each brush is coupled thereto. And coupled to the mounting plate 37 is the brush body 26 which has brush bristles 27, 28 extending to the tips 32 therefrom. As can be seen in FIGS. 5, 7, 8 and 10, there is significant overlap in the rows and arrangement of the brushes. The overlap improves the cleaning efficiency and effectiveness as described in greater detail herein below with regards to FIGS. 7, 8 and 11.

Figure 7:
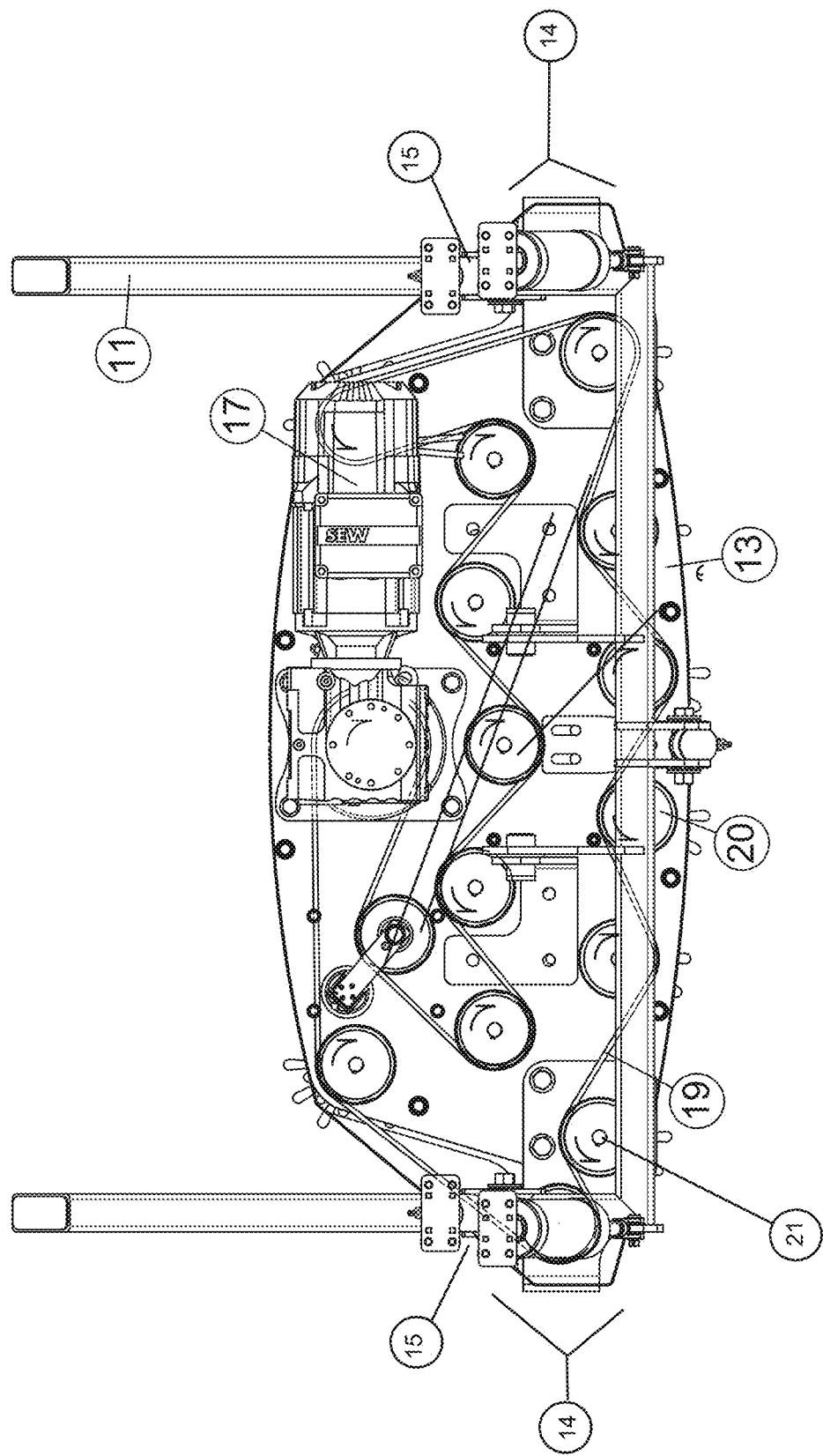
FIG. 7 shows a top view of module three of the exemplary embodiment of FIG. 1, showing the drive motor and power transmission unit.

FIG. 7 shows a bottom view of module three of the exemplary embodiment of FIG. 1, showing the drive motor and power transmission unit. Though reference is made to the exemplary embodiment of the third module (m3) brush head assembly shown in FIGS. 4-17c which shows a set of brushes configured to overlap and angled in the arrangement in three rows, it would be understood by one of ordinary skill in the art that increased numbers of brush heads and rows can be added without departing from the spirit of the invention. The third module (m3) assembly provides for significant advantages based on its overlapping brush head configuration, taper, counter rotational forces, and bristle configuration on the brush heads themselves.

As seen in the top view, the drive device 17, which is shown as but is not limited to a combination electric motor and gear reducer, which is mounted on a module plate 13 and drives the brushes of the module. This is done through a drive transmission system or power transmission device 19, shown in the exemplary embodiment as but certainly not limited to a power transmission driver or drive pulley 18, timing belt or transmission device 19, and brush pulley system 20. The motor 17 transmits power and the transmission converts the power to a driving rotational movement via power transmission driver or drive pulley 18 which turns the power transmission device 19, shown here as the timing belt. The timing belt 19 is coupled to transmission pulley 20 on each shaft 21. The transmission pulley 20 on shaft 21 extends above the module mounting plate 13 from the upper cartridge 22 as shown. The brush shaft is put into rotational motion by the transmission pulley 20 into the rotary brush 25 that is attached to the distal end or bottom of the shaft 21.

The rotary brushes 25 operate while being supported on the mount plate 13 which spans the pan conveyor 430. The mount plate 13 also allows for and provides a mounting means for the vertical brush shafts 21, pulleys 20, transmission system and drive device 17. The vertical brush shafts 21 are contained within the upper cartridge 22 and lower cartridge 23 where they are rotatably supported and extend upward or downward respectively. The pulley 20 engages the top input section of the brush shaft 21. The brush shafts 21 are put in rotation thru the driving action of the power transmission system but are driven in the exemplary embodiment shown in alternating and opposite rotations. That is, the brushes are counter rotating as to the brushes immediately next to the brushes in the layout of the exemplary embodiment of FIG. 7 as shown by the rotational notating arrows.

Again, as seen in FIG. 7 by the directional arrows, the brush shafts 21 are put in rotation thru the driving action of a power transmission system but are driven in the exemplary embodiment shown in alternating and opposite rotations. This enhancement provides multiple advantages. First the overlap improves cleaning, as discussed herein. Further, this layout provides counter rotational momentum within the assembly. In an alternate exemplary embodiment, the shafts and thereby the brush heads can be configured in equal pairs to the left and right of the center of the module and the equal pairs can be similarly spun in opposed directions. The counter rotation of the brush heads needs be equal and opposite relative to the center of the module to achieve the needed counter rotational balance. Additionally, each brush 25 is specifically configured in its brush layout on the rotary brush module with each rotary brush 25 detachably coupled to the brush shaft 21 through the brush mounting plate 37 via a tool less installation, as described further herein with respect to FIGS. 12-17c below, which further contributes to the improved performance of the brush head assembly as the third module (m3).

Figure 8:
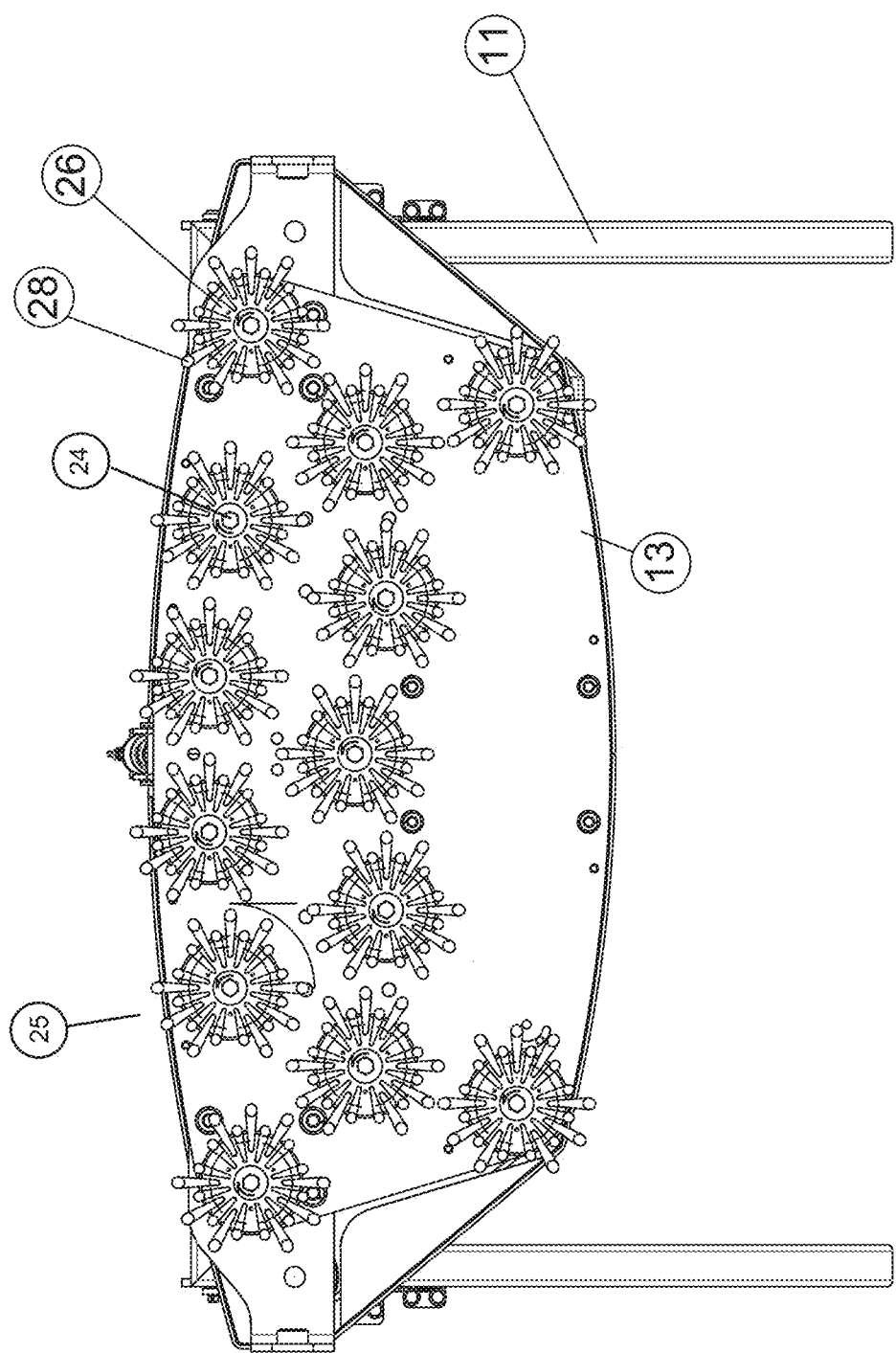
FIG. 8 shows a bottom view of the exemplary embodiment of brush module three shown in FIG. 7.

FIG. 8 shows a bottom view of the exemplary embodiment of brush module three shown in FIG. 7. Again, module mounting plate 13 is shown with the rotary brush heads 25 coupled to and driven by shafts 21 which extend from the lower cartridge 23. Arrows show the corresponding counter rotational drive of each rotary brush 25. The cartridge fasteners 24 are shown coupling the rotary brushes 25 to the shafts 21, as further seen in FIG. 14 below. The outer and inner brush head bristles 27, 28 are shown in the configuration discussed herein below in relation to FIGS. 12-17c.

The overlap configuration is further shown here, as evidenced by the arc showing a portion of the permitter of rotation of a rotary brush 25 in one row relative to the on-center location of shaft 21 of the rotary brush 25 in the following row.

Figure 9:
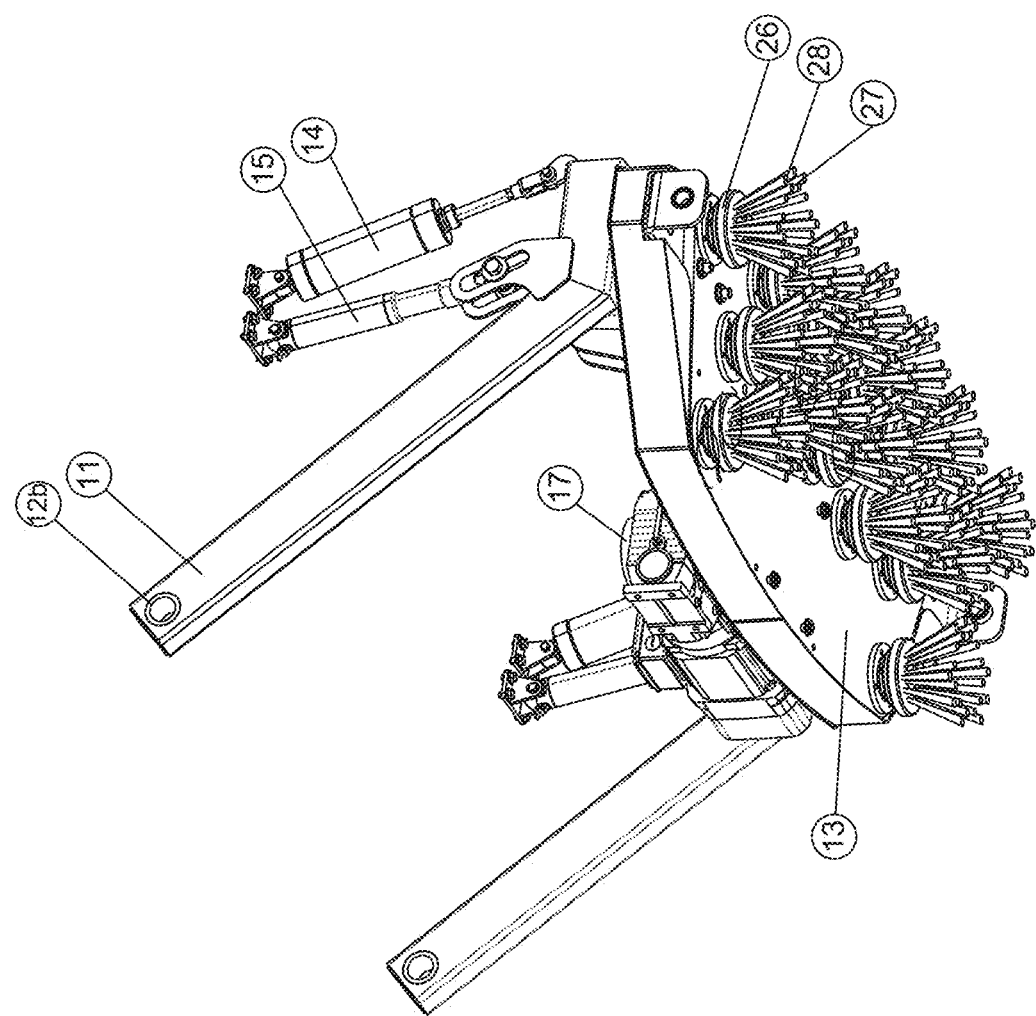
FIG. 9 shows an isometric front view of the exemplary embodiment of brush module three shown in FIG. 7.

FIG. 9 shows an isometric front view of the exemplary embodiment of brush module three shown in FIG. 7. Swing mount arms 11 are shown with pivot points 12b, which couple the third module (m3) to the conveyor frame 43 and frame element 12a, as discussed herein in relation to FIG. 1 above. Limiter 15 and actuator system 14 are shown. The additional leveler element the tilt leveling actuator 16 is shown, this allows the module the ability to tilt and is similar in function to the limit actuator 15 as discussed above but with respect to tilting the module. It similarly reports information to and is controlled by the controller 14a. The module drive 17 is show on mounting plate or deck 13 with rotary brushes 25 extending therefrom. The rotary brushes 25 having a brush plate 26 with outer and inner bristles 27,28, thereon.

Figure 10:
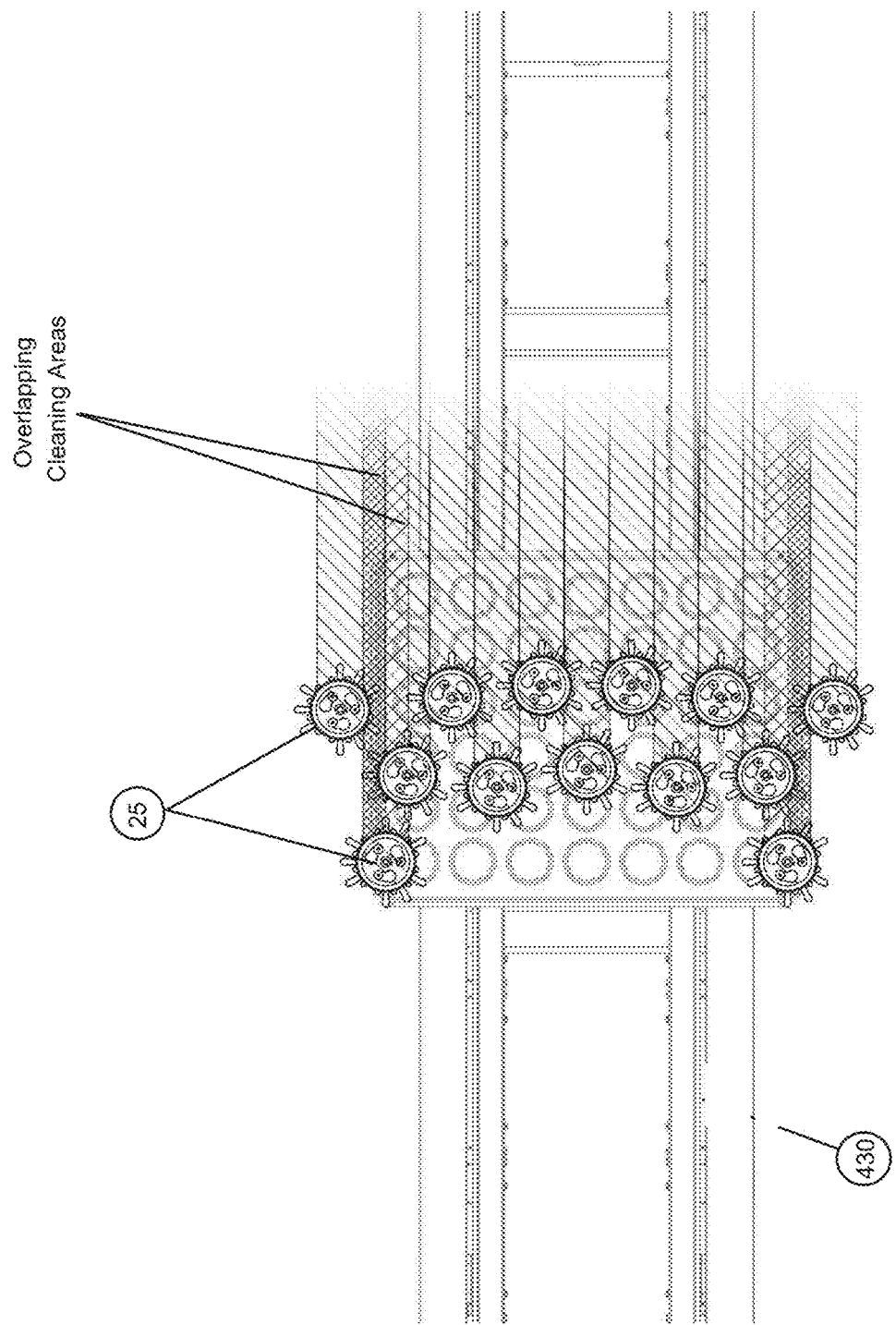
FIG. 10 shows a top-down view of the embodiment of brush module three shown in FIG. 7 with grey hatching representing the areas of coverage for the brush heads as the tray passes the brush heads.

FIG. 10 shows a top-down view of the embodiment of the brush assembly of module 3 shown in FIG. 6 with grey hatching representing the areas of coverage for the brush heads as the tray passes underneath. The path of each brush is shown such that the area of coverage and redundancy in the spacing is evident. A first improved aspect in the brush head assembly of module three (m3) is overlap coverage shown in FIG. 10. As best seen in relation to FIGS. 8-10, there is overlap of width for all the brush heads in the configuration of the third module (m3) such that the area cleaned by each brush overlaps the effective cleaning area in compression for the brush, e.g., the minimum effective area of the brush in cleaning. So that the compression on both the inside and outside surfaces of the lip of the pan, where the efficiency of the brush is reduced to only a portion of the bristles due to these compressive forces reducing the contact area, is covered by the overlap of the next additional brush. Another aspect of module three (m3) is to ensure the correct path of the inner brush bristle 27 and outer brush bristle 28 and have the brushes 25 spaced out to provide overlap as well as agitation at the locations needed to do its cleaning operation. That is the spacing of the inner and outer bristles 27, 28 on the brush plate 26 is configured to work in conjunction with the overlap and the deflection that occurs on the pan.

As an example, when the brushes 25 are cleaning the top surface 4 of the pan 3 and approach the leading and/or trailing pan perimeter inside surfaces 6, the rotating brushes 25 are approaching the leading and trailing areas of the inner pan perimeter 6 or outer pan perimeter 7. The brush head and bristles are most efficient when the path of brush bristle tips 32 can sweep across the pan surfaces 4,5,6 rather than be compressed as when it contacts the inner pan perimeter surface 6 and it is on such an angle that the bristle will bend back to a point. During this compression, the brush bristles effectively stop brushing with the bristle tips 32 and instead tend to wipe across the surface and performs a less effective brushing action.

This typically occurs when the brush 25 starts to go over and enter/exit the approaching or leading edge of inner perimeter 6 which is typically an inclined or rounded edge within the pan 3 going around the entirety of the inner perimeter 6 as shown. Similarly, a compression occurs at the trailing edge of inner pan perimeter 6 of the bun pan 3 or as the brushes go along the side edges of the pan along the inside perimeter 6. In these cases where the brush is approaching the inner part of the edges of the inner perimeter the bristle tips 32 will contact and brush the inner pan perimeter surface 6 and at first the line of contact between the brush bristle tips 32 and the inner pan perimeter edge 6 may be from 11 o'clock to 1 o'clock, the beginning of the aforementioned compression. As the pan 3 continues to approach the rotary brush 25 the contact width of bristle tips 32 that will contact the pan inner perimeter surface 6 will increase to a wider amount up till the time when the center line of the brush rotating shaft 21 is at or very close to the peak of the upper edge of pan 3 at which point the contact width will be approaching the full width of the brush 25 less any bending curvature of the bristle.

Once the contact angle goes beyond the sweep angle of between about 10 till about 2 o'clock of on the rotary brush 25 the brushing and or cleaning effect of the brush inner bristles 27 and brush outer bristles 28 in motion will be reduced as the bristles will tend to bend backwards and go from a brushing effect to a wiping action where the wiping has far lower ability to dislodge debris and adhering materials as previously stated. An improved configuration of the brush heads is needed so that through the overlap of the brush heads, there is at any given time along the permitter properly oriented bristles on the single pass of the pan. An example of this compression issue can be best seen in FIG. 11.

FIG. 11 shows compression of the bristles of a single brush head due to the height of the lip of the pan. A single brush head 25 is shown with the outer brush bristles 28 extending and being deflected by the pan 3 during operation of module three (m3). The pan 3 is traveling in the direction of the arrow noted. The brush head 25 is engaging the inner permitter 6 of the pan 3 at its "lip" and the outer bristles 28 and the respective tips 32 are shown. The deflection of bristles in this fashion is one of the issues faced in maximizing the cleaning efficiency of brush head assembly of module three (m3). Though brush module and cleaning machines exist that attempt to clean pans, the prior art devices had numerous significant shortfalls. A principal shortfall has to do with the aforementioned compression of the bristles as they are passed over the pans. The instant invention addresses this with the brush head configuration and brush heads which provide overlap and the indicated bristle orientations that address many of these shortfalls.

To provide enhanced cleaning action on the improved brush head assembly of the instant invention the instant invention uses sufficient numbers of brushes in an overlapping configuration so that there is overlap of the areas where effective cleaning can be provided throughout the travel of pan 3. In the exemplary embodiment shown, as a non-limiting example, the brush heads have a staggered overlap with about two hundred percent coverage where the shaft centers in the path of pan travel would be at 3.5 inch centers or one-half of the center to center distance of the brush shafts 21 offset in counter rotation and rows as noted above. In terms of angles and swept area the sweeping angle of between about 30 to 60 degrees and more specifically a sweep angle of 30 degrees off center in both directions to provides a total of 60 degrees of swept area in the non-limiting exemplary embodiment. The resulting lateral swept area with the on center configuration measurements would therefore be about one and three quarter inches to each side of the center line of the rotary brush 25 in the non-limiting exemplary embodiment. When combined in such a configuration, each rotary brush 25 has a swept width of three and a half inches and the adjacent brushes would have the same area to generate the full width of optimal cleaning/brushing area and this is where the brush bristle tips 32 are contacting the approaching leading/trailing inner pan perimeter surface 6 edges. This is staggered from the next row such that the overlap covers the previous area with two additional brush heads passing off set from and passing across the same area as the row directly ahead of the following row relative to the direction of travel of the rotary brushes 25 over the pan 3 as seen in FIG. 10.

In addition, the spacing of the bristles in the brush head 25 itself of the instant invention is such that it reduces this inefficiency as that brush head is passed into contact with the lip and deflection occurs. This is due in part to the spacing and angle of the bristles, as more clearly shown in relation to FIGS. 12-17c. With a brush where the outer brush bristles 28 and inner brush bristle 29 emanate out from the brush body 26 which holds the brush bristles at non-sequential or "uneven" angles relative to one another. The angles 29, 30, respectively, that the inner brush bristles 27 and the outer brush bristles 28 are affixed to the brush body 26 can vary so that they are suited or are able to brush against the sides of the pan perimeter both inside and outside pan perimeter surface 33 and outside pan perimeter surfaces 34.

Thus, referring again to FIGS. 10 and 11, the brush bristles in the exemplary embodiment shown will flair outwards as in a skirt fashion as one views the bristles from top to bottom. Where outer brush bristle 28 with tips 32 are in contact with the inner perimeter pan sides 6 at an angle of between about 15 to 45 degrees where about typically a 25 degree angle is presented. The inner bristles 27 can be flared or in a skirt manner also at angles of between about 15 to 45 degrees but are about typically 30 degrees. This cleaning operation requires that the bristles 27, 28 also are able to go into corners where converging surfaces meet such as but not limited to where the inside pan perimeter surface 6 and the top of the pan top surface 4 converge.

It was also realized that the entire leading and trailing sides of the inner perimeter 6, as opposed to side perimeter edges which were previously discussed, of the bun pan 3 would need to be brushed and that the rotary brushes 25 used would clean in the most optimal way when the inner brush bristles 27 and outer brush bristles 28 contact the inner bun pan perimeter surface 6 at an inner brush bristle angle 29 and outer brush bristle angle 30 that allowed the inner brush bristle 27 and outer brush bristle 28 to brush the inside pan perimeter surface 6 with the tip of the brush bristle 32 rather than have the inner brush bristle 27 and outer brush bristle 28 bend and then all brush bristles behind it would also bend and lay on each other so that in effect they would only be wiping or glance stroking the inclined inside edge of the inside perimeter surface 6 of pan 3.

To address this the inside brush bristles 27 and outside brush bristles 28 are a combination that are offset in their rotational path so as to not be able to have leading brush bristles lay back on top of one another in a layer. Additionally, to prevent or reduce the layering effect the instant invention provides brush bristle gaps 31 in between clusters of brush bristles and to have a more open disbursement of brush bristles within the brush plate 26 and to avoid having them laying over and having them layer to where the other following brush bristles layer onto earlier brush bristles. The design of the brush can be best seen in FIG. 12-17c.

In the central area of the bun pan 3 the brushes 25 are rotating freely and are not subjected to the same high bending forces as compared to the leading and trailing edges of the pan. In the central area of the bun pan 4 the brush 25 is not contacting pan perimeter inside surfaces 6 edges so that the brush bristle tips 32 can freely rotate and just be in contact with the pan top surface 4. So, for that operation the brush bristle tips 32 would be operating or cleaning for the entire diameter or face width of the brush 25 in which case when the brushes 25 are located at 3.5 inch centers the pan will have 200 percent cleaning coverage to the pan surface. It can also be understood that bristles of other and or combinations of angles in a single brush could be used without departing from the spirit of the invention.

The brushes 25 would also be brushing the top pan surface 4 and if too much brushing action was taking place there then it may compromise the lifespan of the release coating used on the pan 3. The instant invention utilizes an optimization calculation of brush heads in the configuration sufficient to clean the pan perimeter inside edges in very little time. To do this, more brushes are employed to get the job done. In the center of the pan the brushes 25 have more effective working area and efficiency as the pan brushes 25 can use the entire path circle area as its proper cleaning area. As an example, when the back/trailing pan perimeter inner surface 6 approaches the brushes the brush will do an effective job of cleaning when the brushes 25 begin to engage the pan perimeter inner surface 6. This way the brush bristle tips 32 strike and sweep against the pan perimeter inside surface 6 but as the pan continues to approach the inside perimeter surface 6. Even when the pan 3 travels further and the lip is more deeply engaged at the pan perimeter inside surface 6 even though the brush bristles will start to bend and lean back to where the sweeping effect of the bristle tips 32 reduces and the wiping effect of the brush bristles increases the following row of brushes will begin engagement with the inside perimeter surface 6. This aids in ensuring sufficient cleaning of all surfaces of the pan 3.

Even with the enhanced bristle layout, the cleaning of the inside perimeter 6 of the pan 3 the brush 25 layout can have other complicating factors where the brushes are not in an optimal location as the pans would vary in width depending on the products to be made and sizes of the products. So, the third module (m3) is further designed provide improved cleaning of the pan inside perimeter and outside side perimeter edges 6, 7 with the overlap of the multiple brush heads as shown by the highlighted areas of FIG. 10. The overlap can be for example, one hundred to four hundred percent, and in a further non-limiting exemplary embodiment an overlap of two to three times or three hundred percent can be used where the center to center locations of the shafts 21 would be at two and three-eighths inches equally spaced across the travel path of the pan 3 and the brush diameter would be at about seven inches based on the selected overlap.

As noted above, the staggered, counter rotation of the individual rotary brushes 25 is a further improvement. The direction of rotation of the brushes is also improved in that the various rotational moments are cancelled in the layout indicated in FIGS. 5-10. In the brush head where each brush that is across the travel path of the pan in the exemplary embodiment alternates in rotational direction as an example, but would certainly not be limited to, when going from left to right such that the first brush would rotate in a clockwise direction and the second would be counter clockwise, the next again being clockwise and alternating in this manner across the width of the pan. The reason being it gives a balanced side loading of force placed on the pan 3 as it goes thru the pan cleaner and is held to and by the conveyor belts. As an example of why this is important, if all the brushes were to be rotating in the same direction, then when a bun pan 3 approaches and contacts the rotary brushes 25 then the rotation of the rotary brush 25 would be forcing or driving the bun pan 3 to go to the side or off of the pan conveyor 430.

And since the device is brushing the outside edges of the pans this cleaning and brush operating area would of be interfering with the utilization or placement of guides in this area. It would also impart additional vibration and lateral forces on the pan cleaning machine 1.

The rotary brushes operate by being supported on a mount plate 13 which spans the pan conveyor 430. The mount plate 37 also allows for and provides a mounting means for the vertical brush shafts 21 and drive device 17. The vertical brush shafts 21 are contained within the upper cartridge 22 and lower cartridge 23 where they are rotatably supported. There is also a power transmission device (timing belt pulley) mounted on the output shaft of the drive means 17 as well as the top input section of the brush shaft 21 as noted in relation to FIG. 7-9 above. When the drive means 17 operates it generates rotational force/energy which it further transmits and delivers thru the power transmission device, but this could also be done using other power transmission materials without departing from the novelty of this invention.

This driving rotational movement is then absorbed in a power transmission conducting device 19 and applied to the power transmission pulley 20 which is then set into rotational motion while being affixed to the top of the brush shaft 21. The brush shaft then putting the rotational motion into the brush 25 that is attached to the distal end or bottom of the shaft 21.

The connection of the brush to the shaft is done so that the brushes 25 can be installed and removed from the brush mount plate 37 in a tool less fashion whereby the brush body 26 has one or more connection buttons 35 which are held in connection to the brush base 26 by the utilization of button attachment fasteners 36. These connection buttons 35 will pass thru a clearance hole 38 in the brush mounting plate 37 and can be rotated in relationship to the slots 39 in the brush mounting plate 37 to where they will lock in place and allow for the rotation of the brush shaft 21 to rotate or drive the brush 25. It should be noted the brushes 25 with mounting buttons 35 can be affixed in either clockwise or counter clockwise fashion provided they are rotated and affixed in the brush attachment plate that permits connection or attachment in that said rotational direction. These elements of the invention can best be seen in the exemplary embodiment shown in FIGS. 12-17c.

Figure 12:
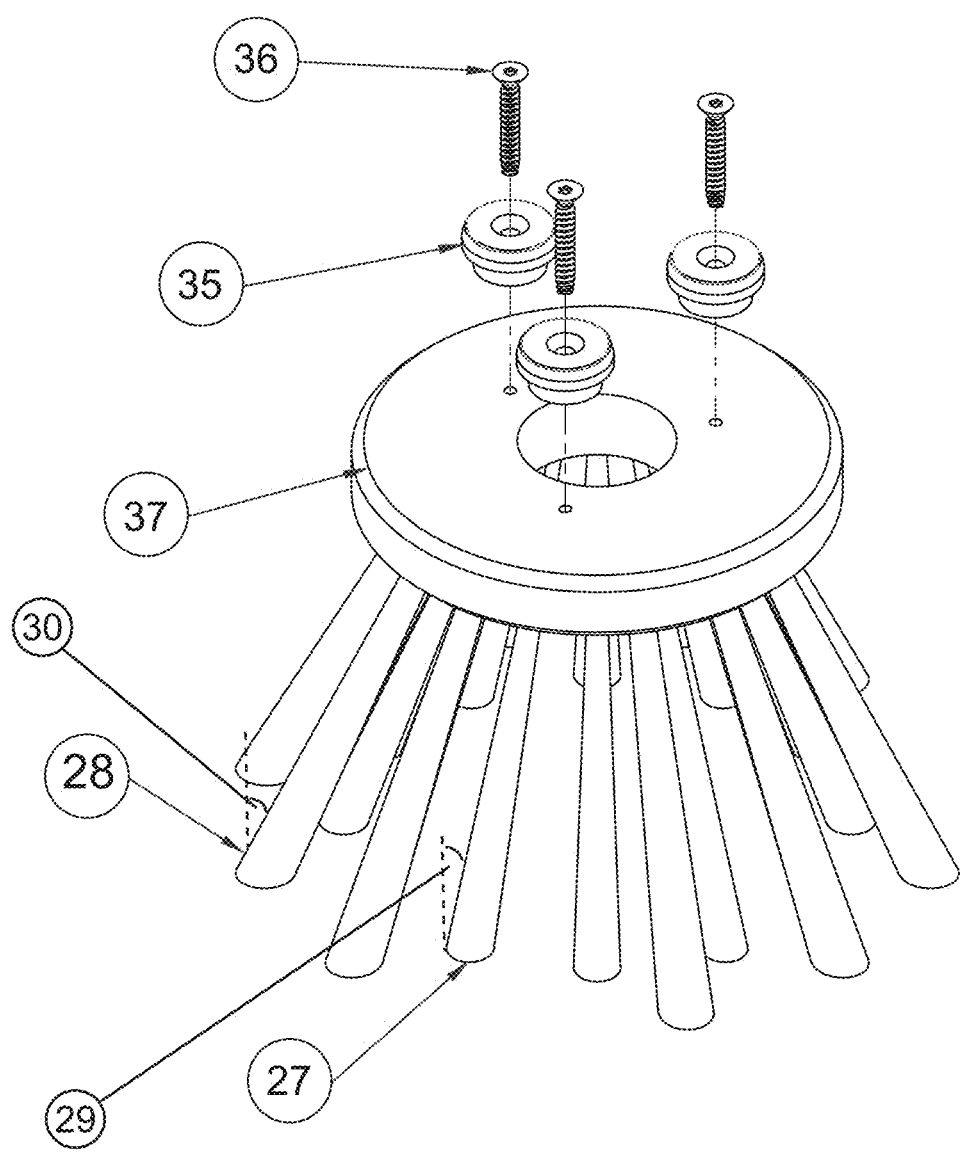
FIG. 12 shows an isometric assembly view of an exemplary embodiment of the brush head of module 3.

FIG. 12 shows an isometric assembly view of an exemplary embodiment of the brush head of module 3. The assembly view shows brush button attachment fasters 36, connection buttons 35, brush base 26, with inner bristles 27 and outer bristles 28 extending from the brush base 26. The inner brush bristles 27 are mounted at an inner brush bristle angle 29. Similarly, the outer brush bristles 28 are mounted at an outer brush bristle angle 30. FIGS. 13-17c show various additional views of the exemplary embodiment of the brush head shown.

Figure 13:
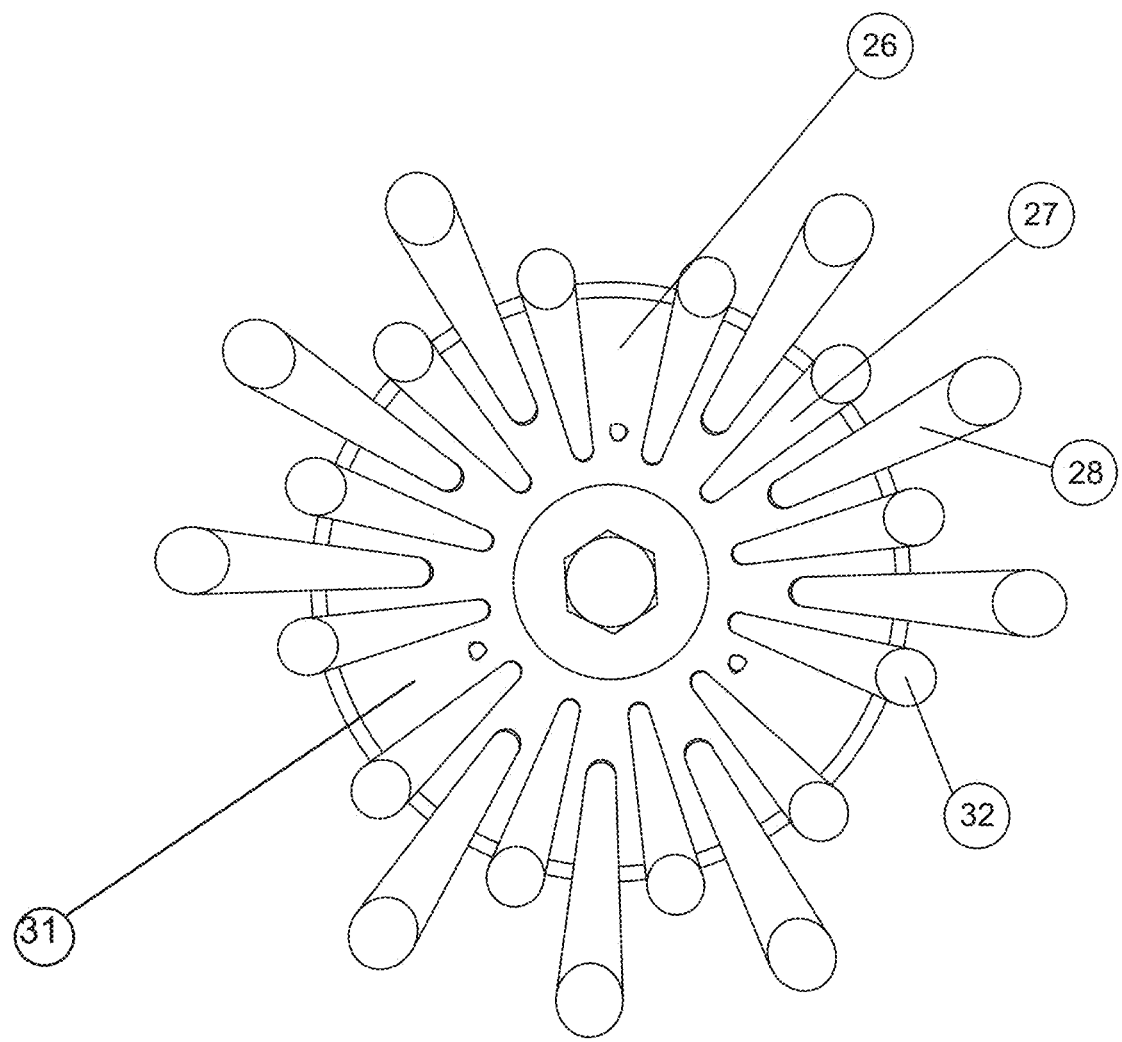
FIG. 13 shows a bottom view of the exemplary embodiment of the brush head of FIG. 12.

FIG. 13 shows a bottom view of the exemplary embodiment of the brush head of FIG. 12. From this view, the brush base 26 can be clearly seen. The distribution of outer brush bristles 28 and inner brush bristle 27 each with tips 32 can be more clearly seen. The bristles 27, 28 being mounted at their respective angles 29, 30. These are distributed with a gap spacing 31 as previously discussed. The distribution with the various angles and gaps providing a non-linear layout relative to the rotational movement.

Figure 14:
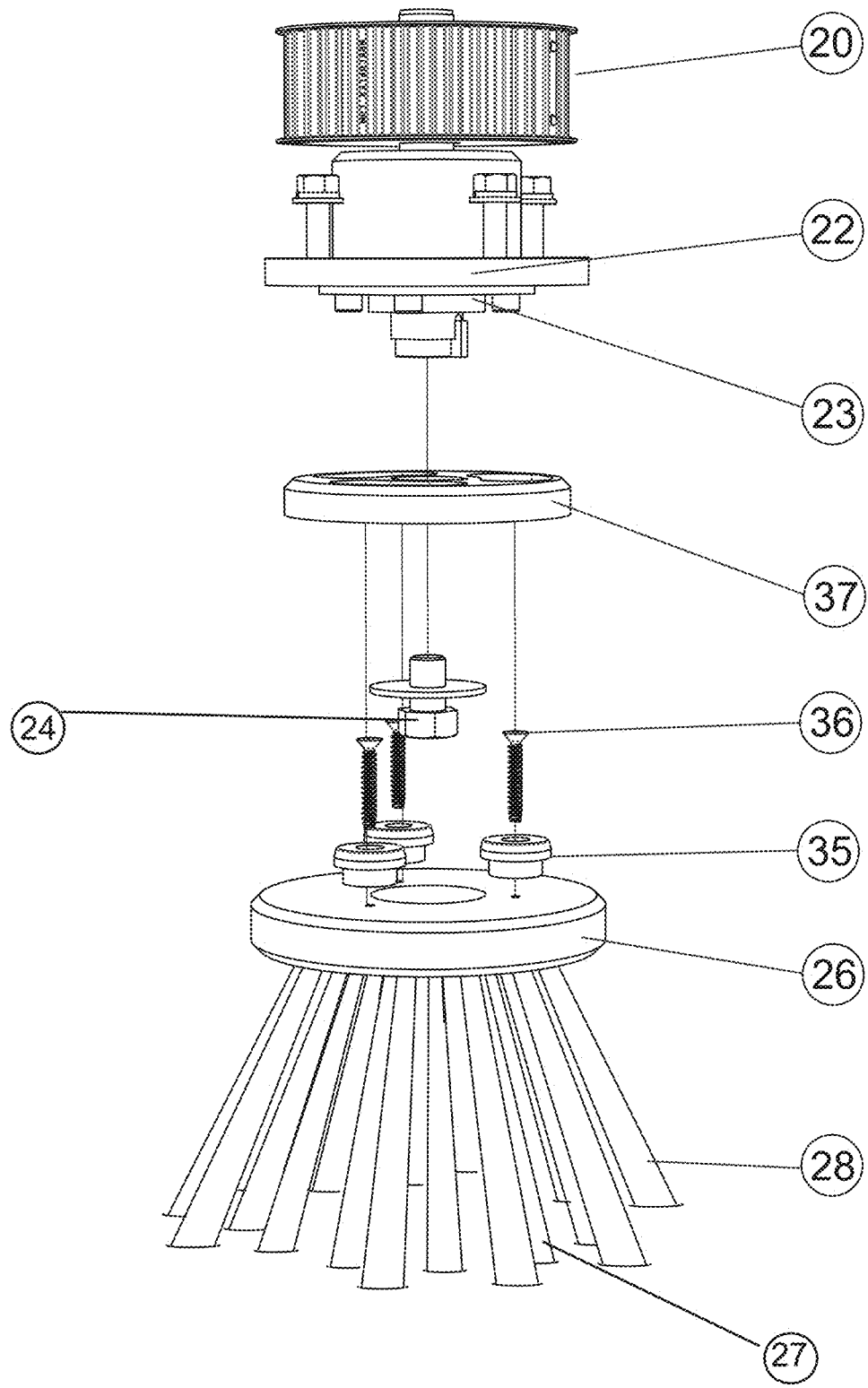
FIG. 14 shows an exploded view of an exemplary embodiment of the brush head, plate and pulley assembly of FIG. 12.

FIG. 14 shows an exploded view of an exemplary embodiment of the brush head, brush plate and pulley assembly of FIG. 7. The lower cartridge 23 and cartridge fastener 24 are shown. These couple the brush mounting plate 37 to the upper cartridge 22 and the rotating shaft 21 driven by transmission pulley 20. As seen in the figure, the outer bristles 28 and inner bristles 27 extend from the brush base 26. Buttons 35 are coupled to the brush base 26 with fasteners 36. Brush mounting plate 37 is shown. As described herein and particularly in relation to FIGS. 16a-c and 17a-c, the brush mounting plate 37 has a slot 39 and a through hole 38 which allows for quick mounting and release of the brush head 25. As noted herein below with respect to FIGS. 16a and 17a, the brush heads can have a directional configuration based on the direction of the slot 39 facing relative to the rotation of the rotary brush 25 in the assembly.

Figure 15:
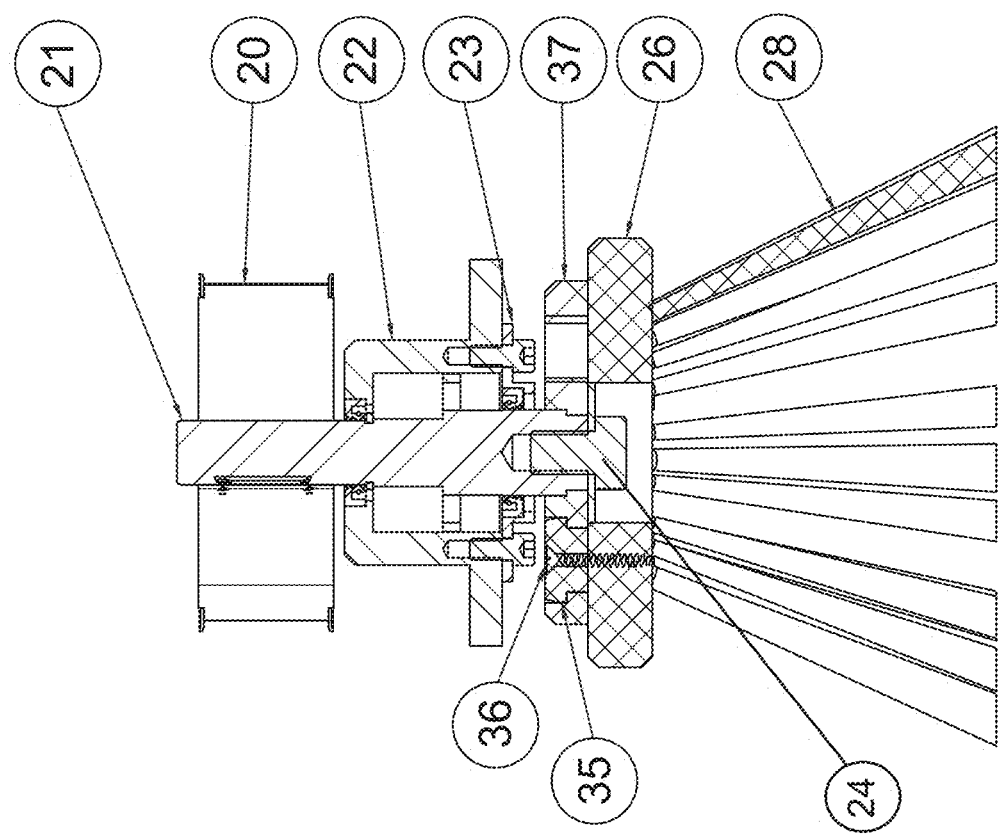
FIG. 15 shows a cross sectional view of an exemplary embodiment of the brush head, plate and pulley assembly from FIG. 14.
Figure 15:
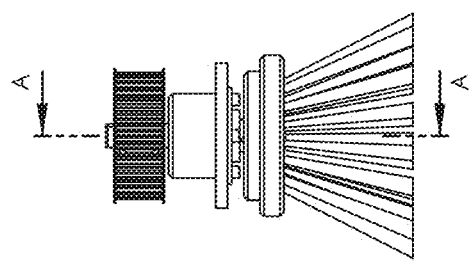

FIG. 15 shows a cross sectional view of an exemplary embodiment of the brush head, plate and pulley assembly from FIG. 14. FIG. 15 shows the brush head of FIG. 14 fully assembled and coupled to the transmission pulley 20, which is part of the pulley system shown more clearly in FIG. 7. Note that the cartridge fastener 24 is shown coupling the cartridge to the mounting plate 37. The brush base 26 engages the buttons 35 with the through hole 38 and the slot 39. The brush plate 26 is thereby affixed to the brush mounting plate 37 and to the lower cartridge 23 with shaft 21 passing through the upper cartridge 24 into the lower cartridge 22 and extending down to separately couple with the cartridge fastener 24. This permits the brush head 26 to be removed by a clockwise or counter clockwise twisting motion as noted in FIGS. 16a and 17a by the arrows.

Figure 16A:
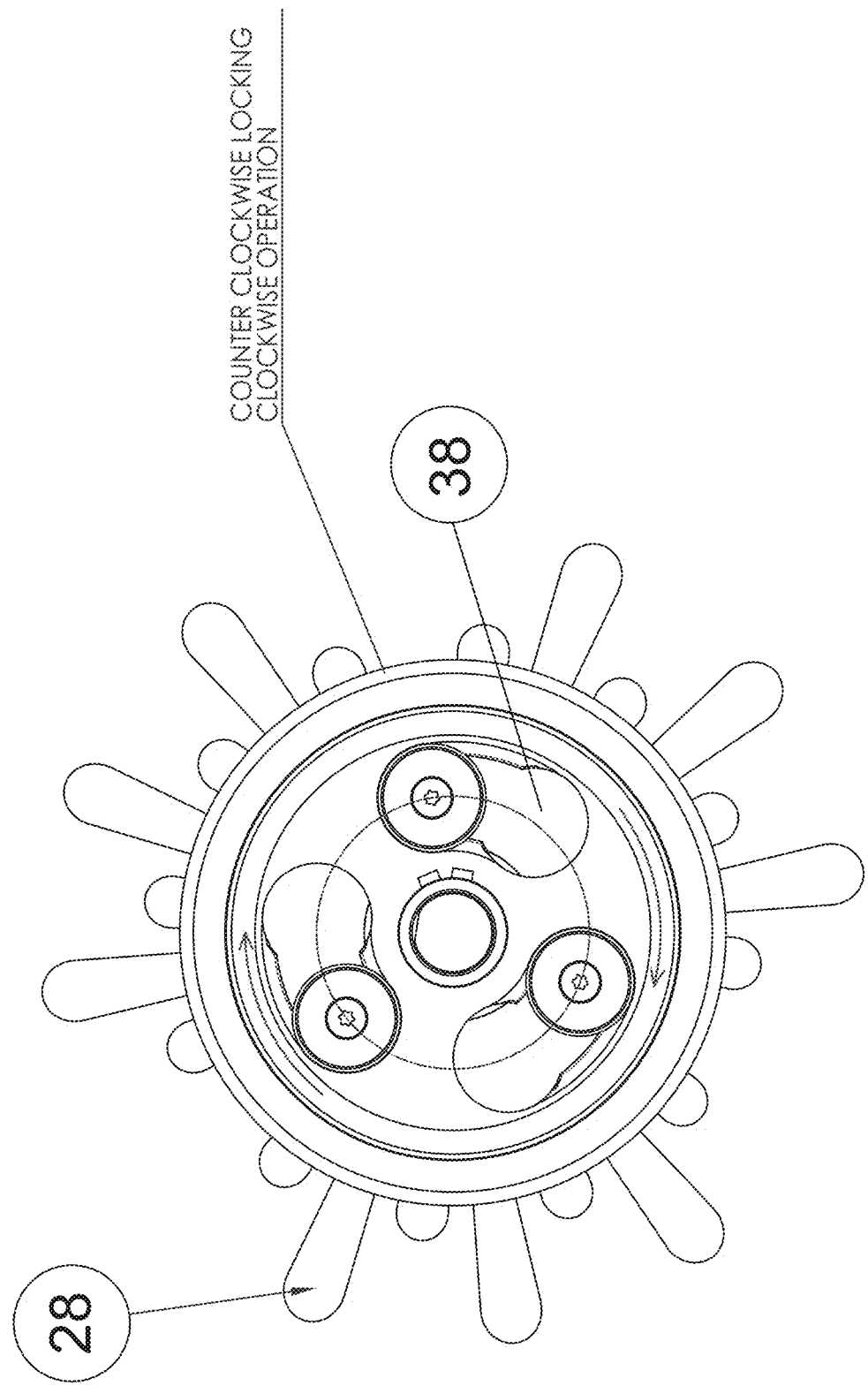
FIGS. 16a-16c and 17a-17c show top, side, and isometric views of the left turn and right turn installation methods of the brush heads on the spindle in an exemplary embodiment of the brush head assembly for module three.
Figure 16B:
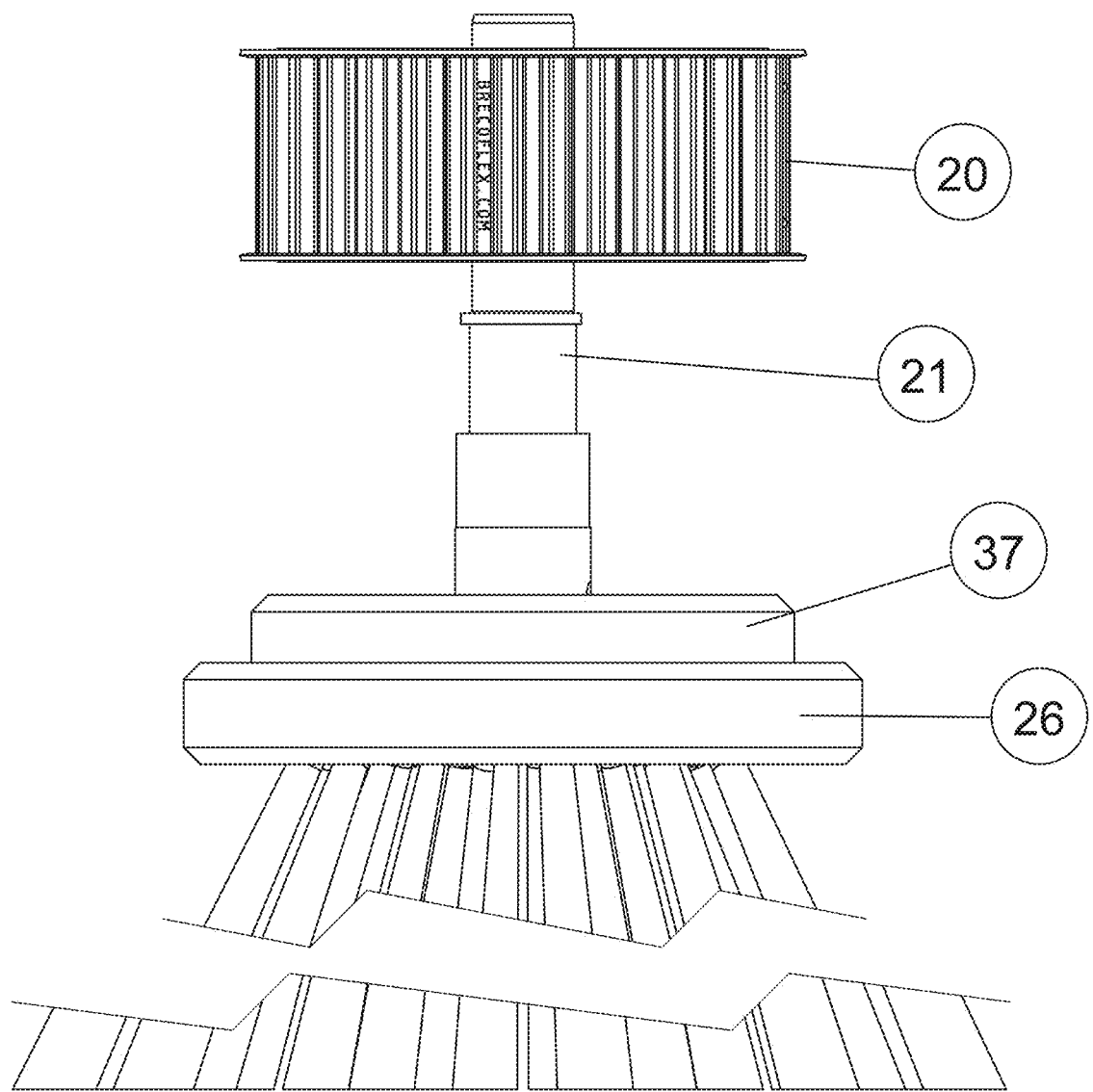
Figure 16C:
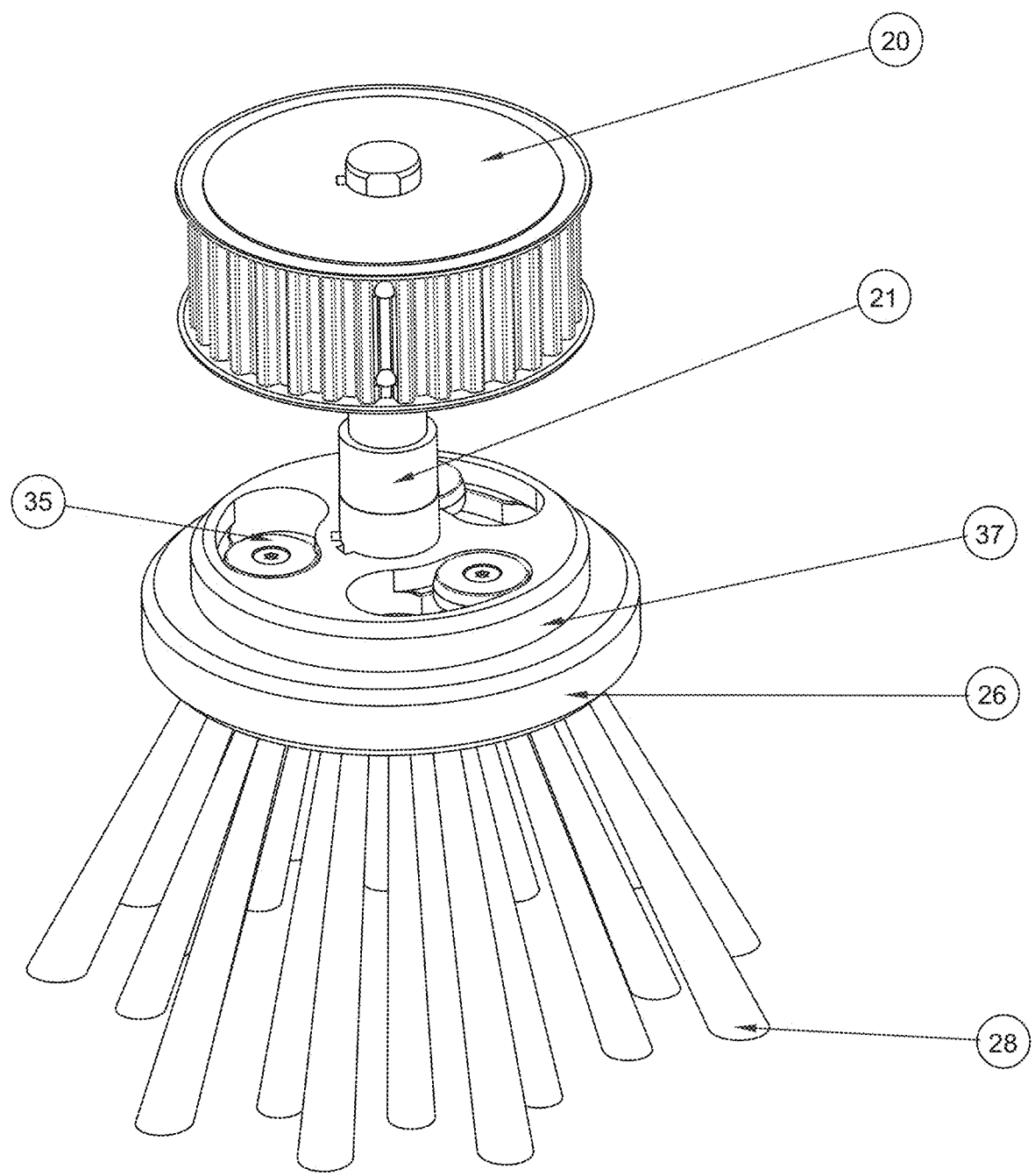
Figure 17A:
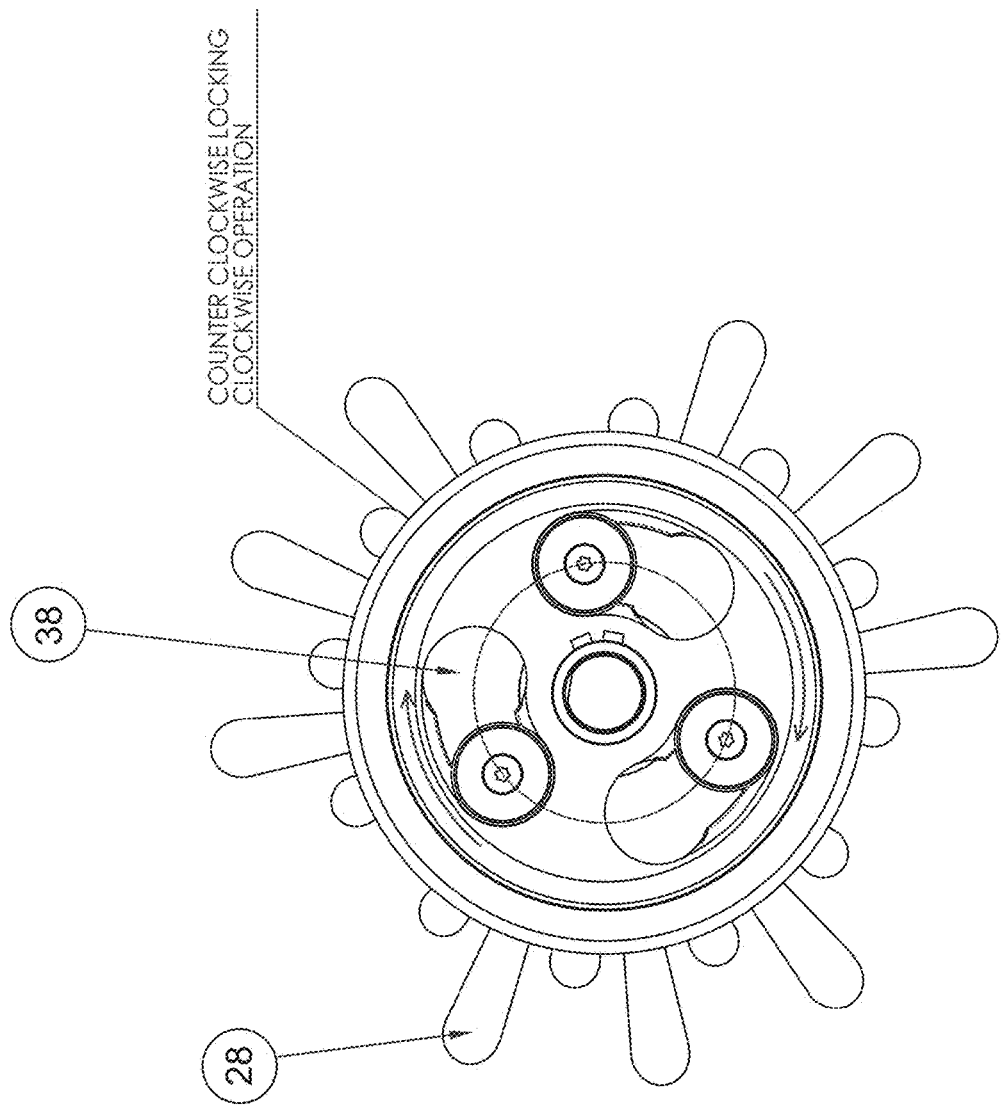
Figure 17B:
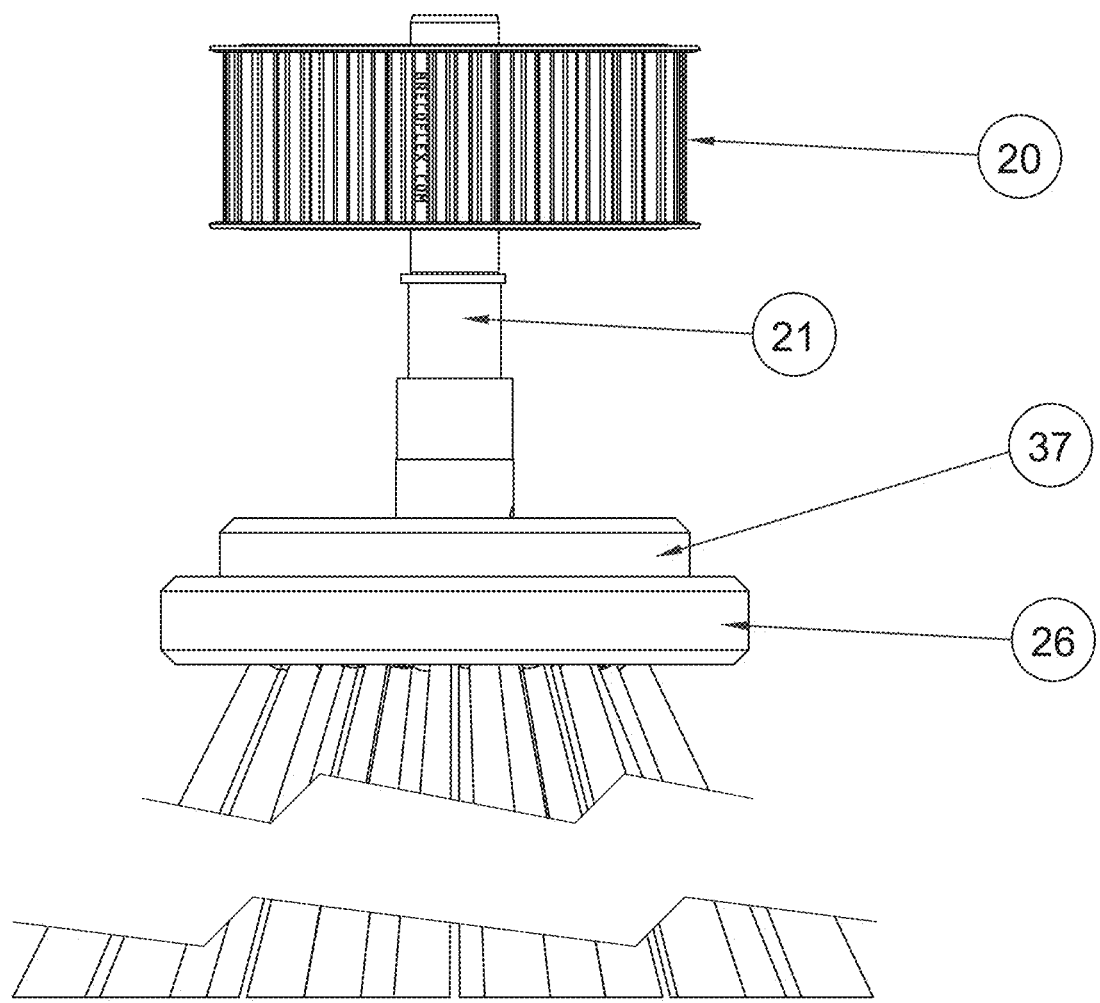
Figure 17C:
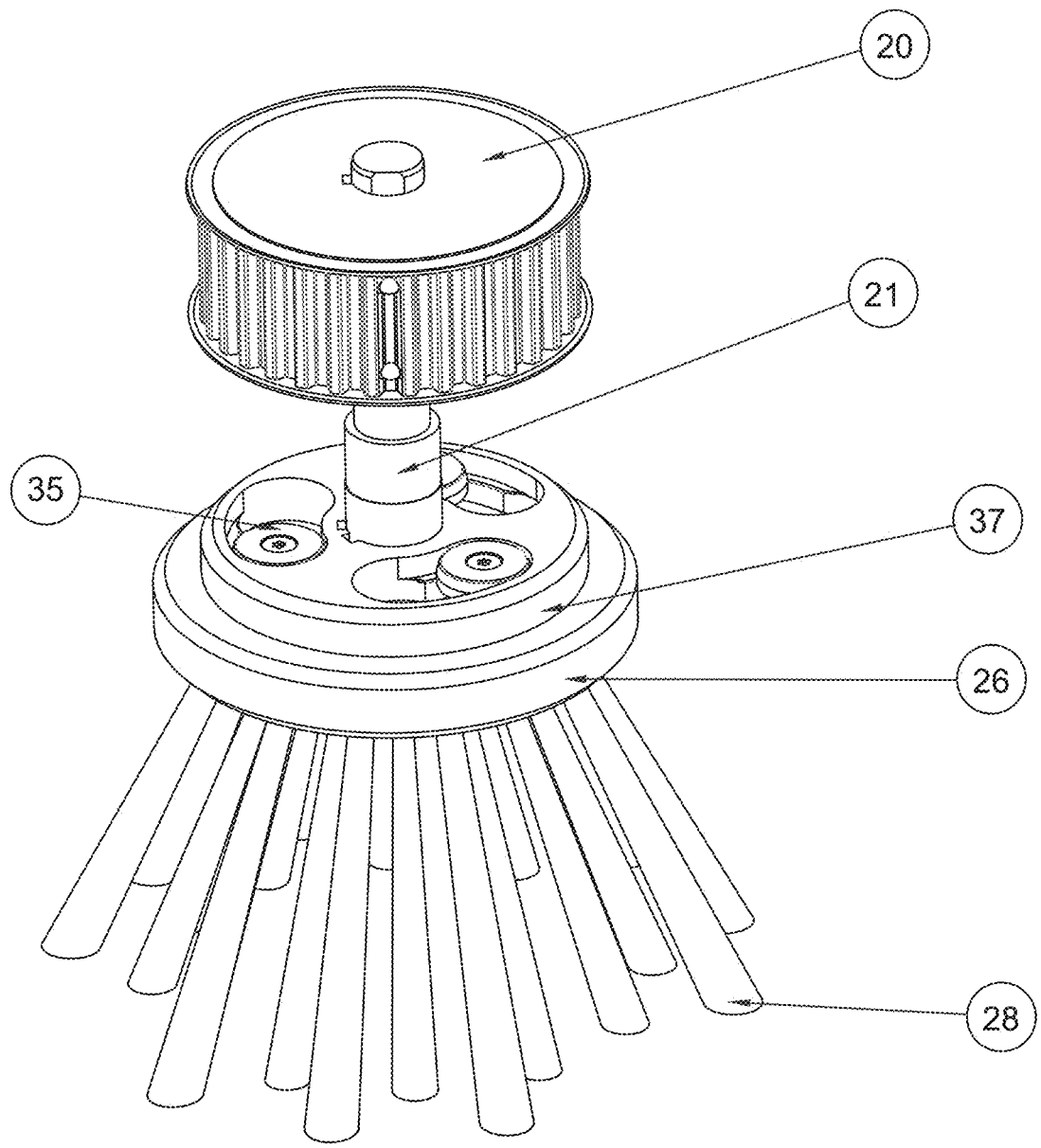

FIGS. 16a-16c and 17a-17c show top, side, and isometric views of the left turn and right turn installation methods of the brush heads on the spindle in an exemplary embodiment of the brush head assembly of FIG. 12. As noted above, the rotational direction of the brush heads can be staged so that the rotational moment of each brush is offset and the driving moment of the third module (m3) is balanced. Thus, each brush head shown in the exemplary embodiment of FIG. 4 has a direction of rotation. The quick release, toolless installation provided in the embodiment shown in FIG. 12 with button 35, slot 39, and through hole 38 must therefore be oriented to this direction of rotation so that the brush head is not spun off the mounting plate 37 during operation. Thus, as best seen in FIGS. 16a and 17a, the slots are oriented for either clockwise or counter clockwise twisting motions for installation.

Figure 18:
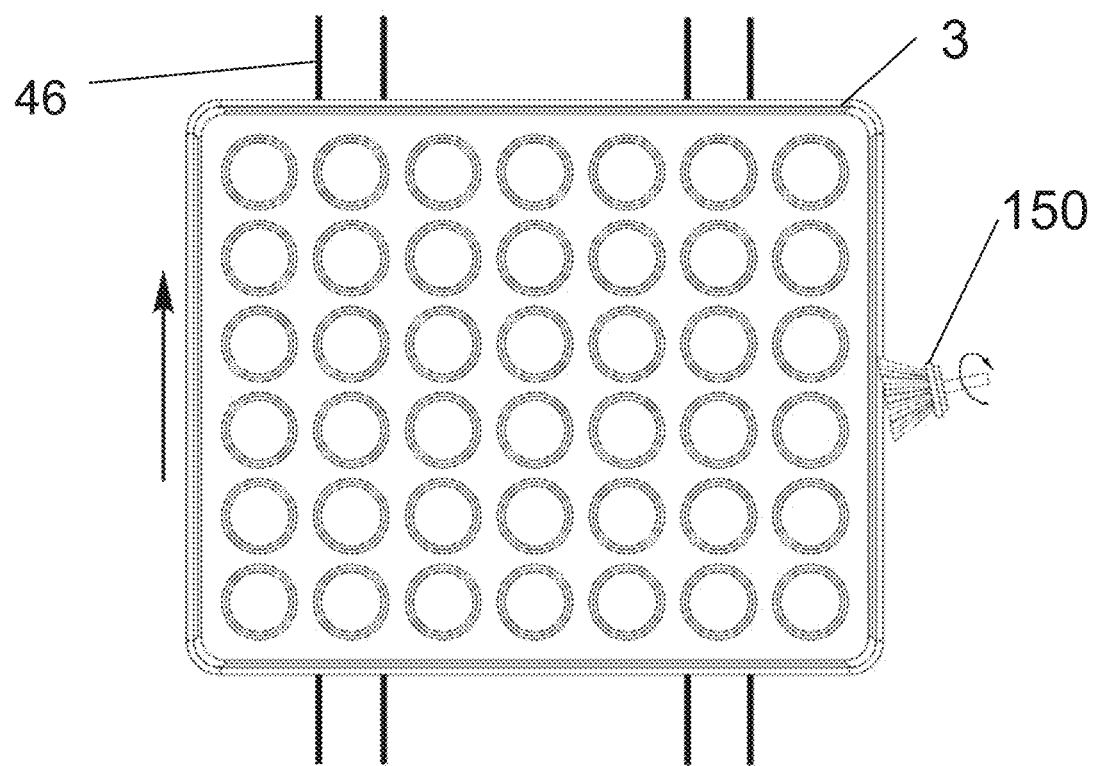
FIGS. 18 and 19 show an additional side sweeping brush of an alternate exemplary embodiment of module three.
Figure 19:
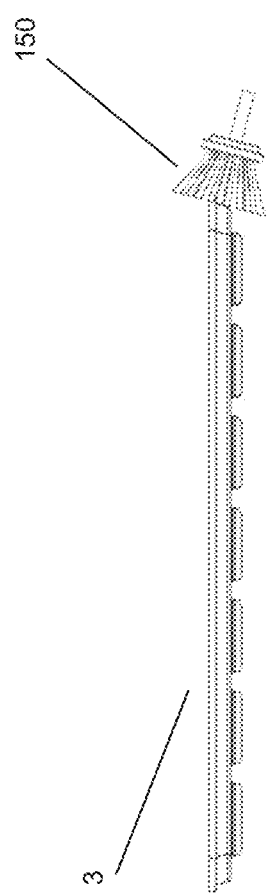

FIGS. 18 and 19 show an additional side sweeping brush of an alternate exemplary embodiment of module three. An alternate inside pan perimeter 6 and outside pan perimeter 7 cleaning method shown in FIGS. 18 and 19, the alternate exemplary embodiment adds a further side sweeping brush 150. In the further exemplary embodiment, via a separate module or incorporated as a component of the existing module three (m3), the alternate side sweeping brush can be added. In the alternative exemplary embodiment of the brush system, as shown in FIG. 18, the added side brushes 150 are specifically employed and extend from the deck of module three (m3) to clean the pan 3 outer sides. In this alternate method of the exemplary embodiment, a side sweep brush 150 that would be held and rotated about a substantially horizontal axis to brush the outer edge of the pan 7. The axis of this brush would not be perpendicular to the pan perimeter but instead the brush rotational axis would be inclined so that the brush would be used to only present the brush 150 to one side of the outer pan perimeter 7.

As a non-limiting example of orientation of the side sweep brush 150, the axis could be perpendicular to the up down inclined surface of the pan perimeter surface but in the horizontal axis of the pan the axis of rotation would be either leaning back or forwards depending on the directional rotation of the brush relative to the direction of pan travel. The driving end of the spindle would be leaning back as compared to the travel direction of the pan in the horizontal direction of the conveyor 430. The lean of the rotational axis of the brush is dependent on the rotational direction of the brush and brush spindle to preferentially and predominantly brush the debris that may be adhering to the pan outer perimeter down and away from the pan perimeter. While it is possible to brush the debris upwards from the pan perimeter it is typically not a preferred direction as there is a high probability for the debris to fall onto the top product producing surface of the pan.

Figure 20:
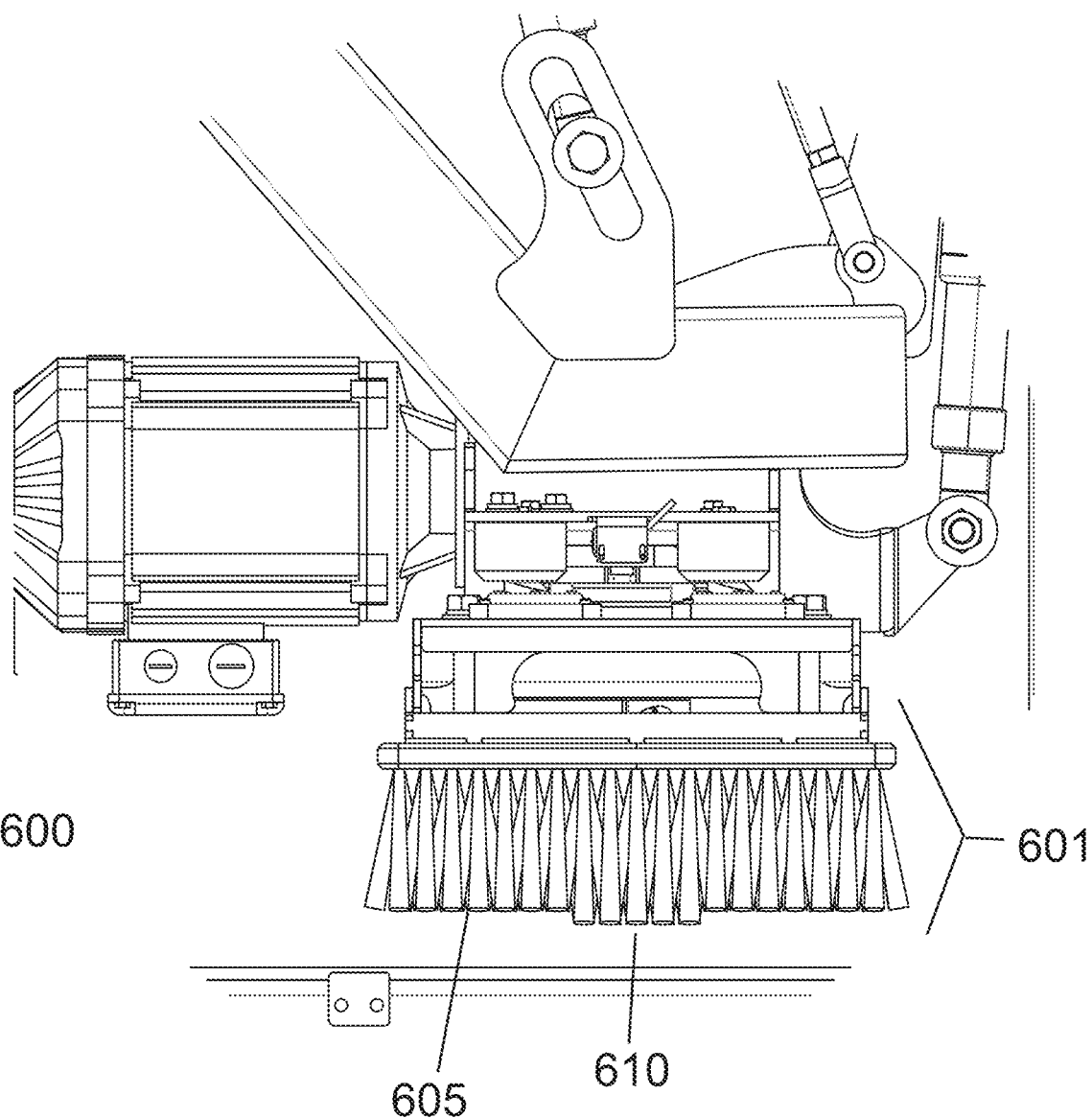
FIG. 20 shows a side view of module four of the exemplary embodiment of FIG. 1.

FIG. 20 shows a side view of module four of the exemplary embodiment of FIG. 1. Module four (m4) is an orbital planetary brush that has been described in previously filed U.S. Provisional Application 62/894,923 and co-pending U.S. Utility application Ser. No. 17/009,203, shown in FIGS. 7A through 8F of those applications and described in the specification therein each of which has been incorporated herein by reference. A horizontal cylindrical brush subsystem 600 is shown in an exemplary configuration as shown in an exemplary embodiment of the invention, is directed to an orbital, or oscillating, or orbital and oscillating flat or planar brush 601 having a flat brush assembly that has bristles arranged and entered into a slab of brush base 605, 610. The planar brush 601 subjects the pan 3 to additional cleaning using higher, longer, taller bristles 605, 610 to scrub the pan surface with sufficient contact pressure and a compound elliptical, planetary scrubbing motion.

Figure 21:
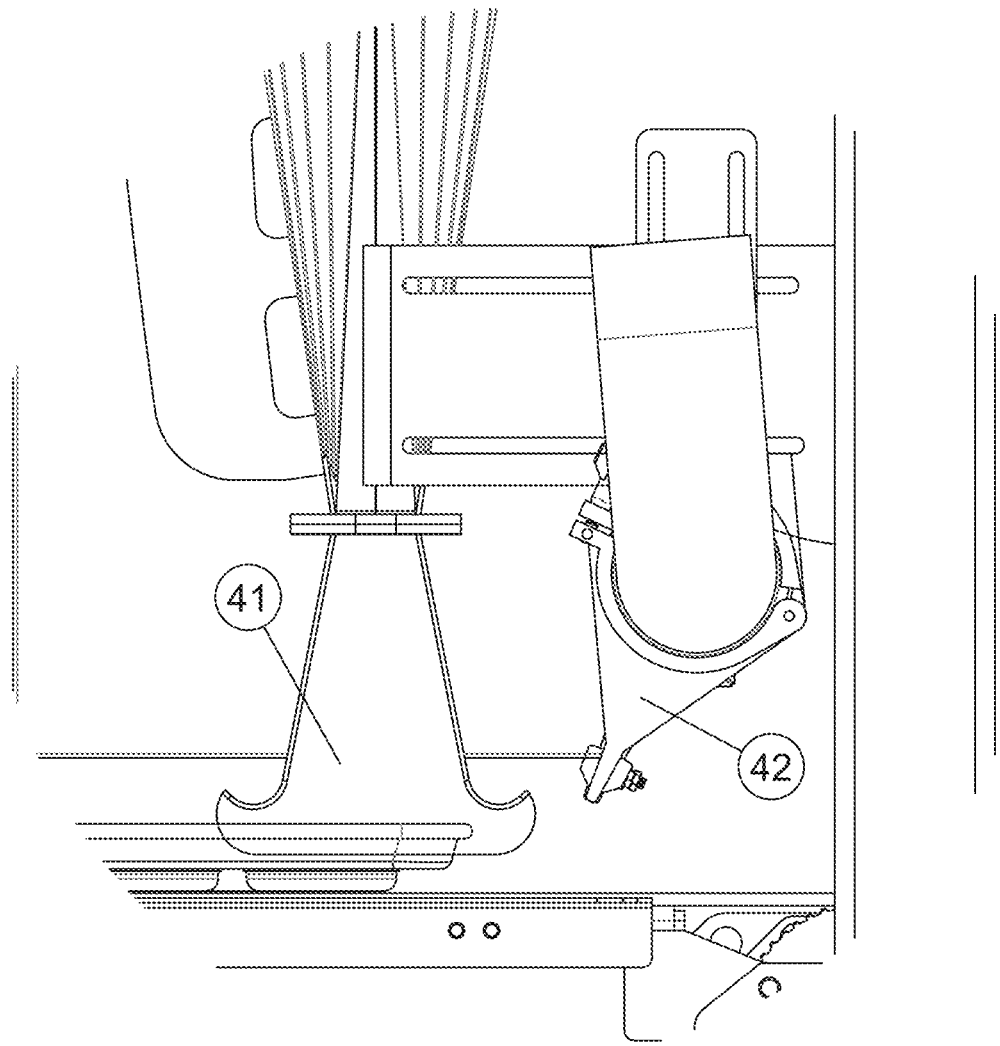
FIG. 21 shows a side view of module five of the exemplary embodiment of FIG. 1.

FIG. 21 shows a side view of module five of the exemplary embodiment of FIG. 1. Module five (m5) is a second vacuum hood at the exit of the pans from the pan cleaning machine 1. The module is shown as a second vacuum hood 41 with a proceeding air knife 42. The air knife 42 takes any or all loose debris that may be sitting on the pan surface 4 or in any of the pan pockets 5 and agitates it so that it becomes airborne and toward the vacuum so it may be removed by the vacuum head.

Figure 22A:
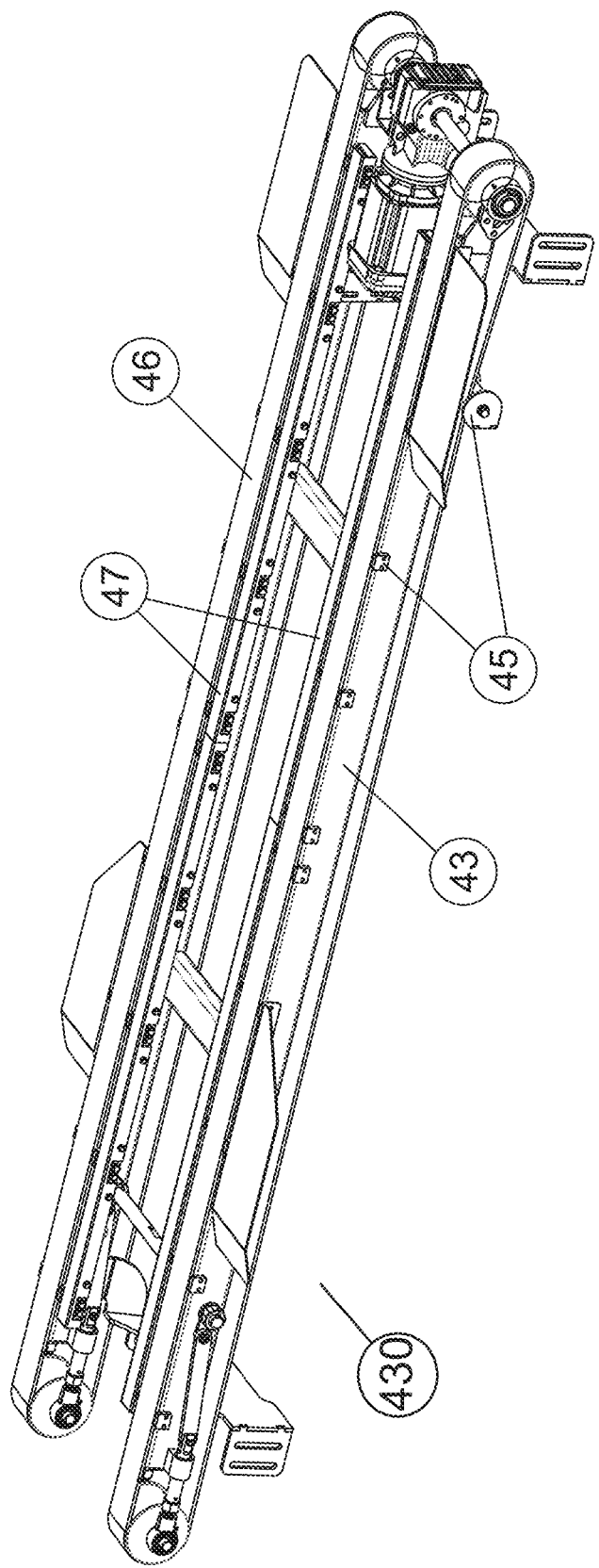
FIGS. 22a-22d show views of an exemplary embodiment of the conveyor system of the pan cleaning system of FIG. 1.
Figure 22B:
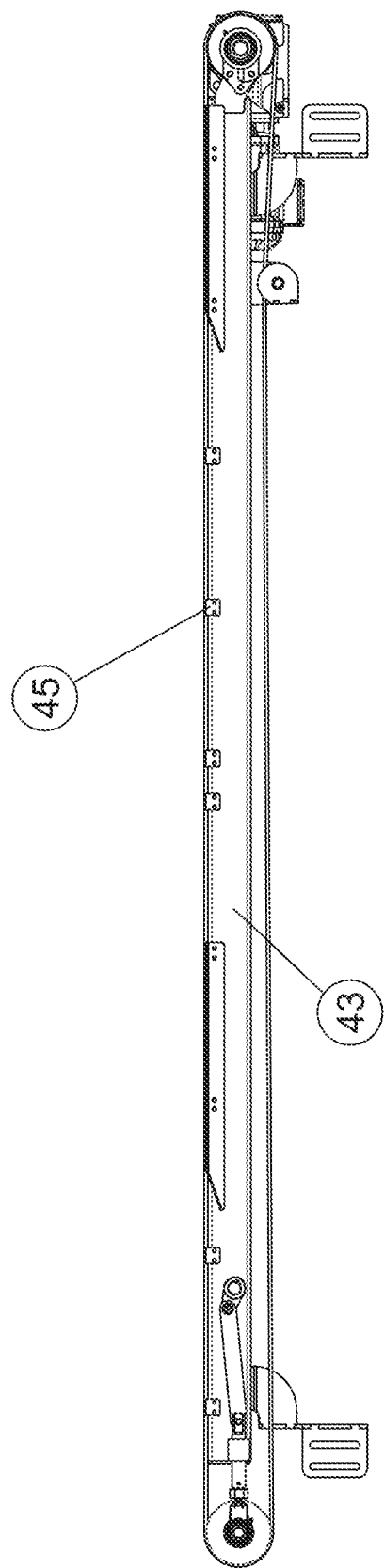
Figure 22C:
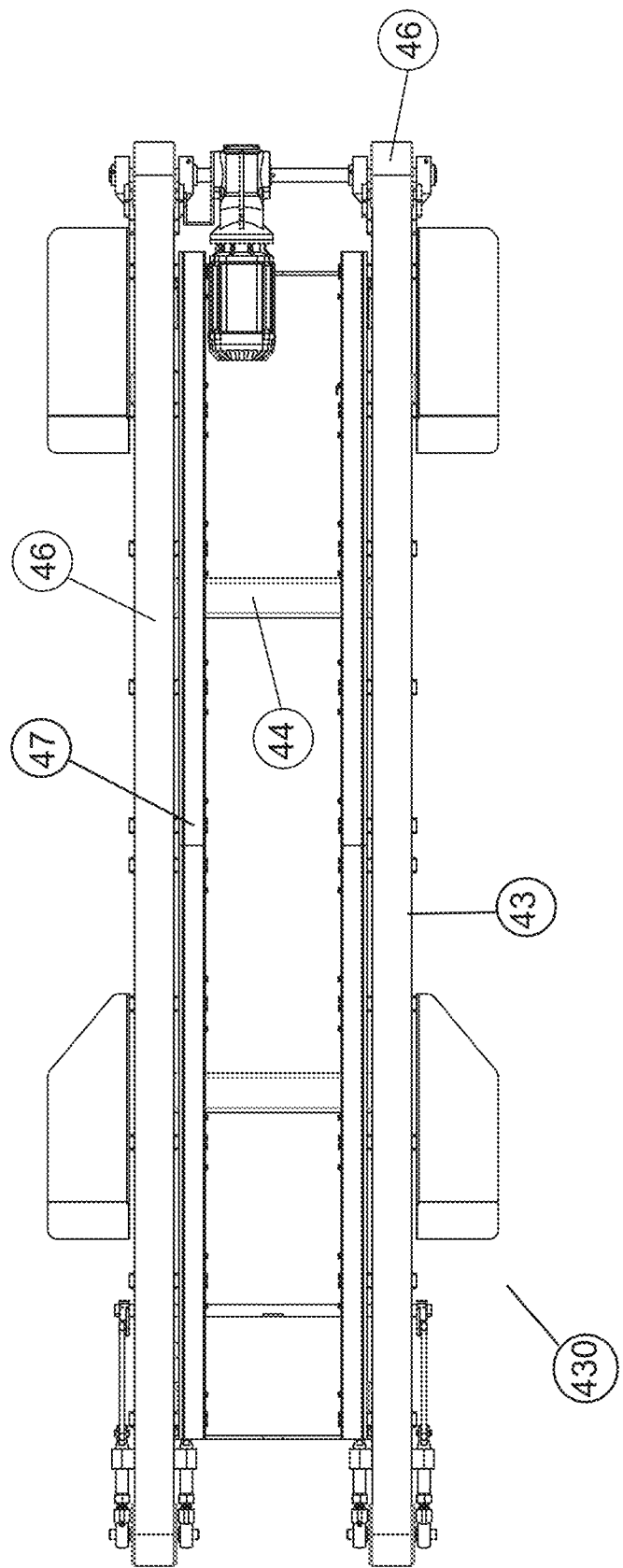
Figure 22D:
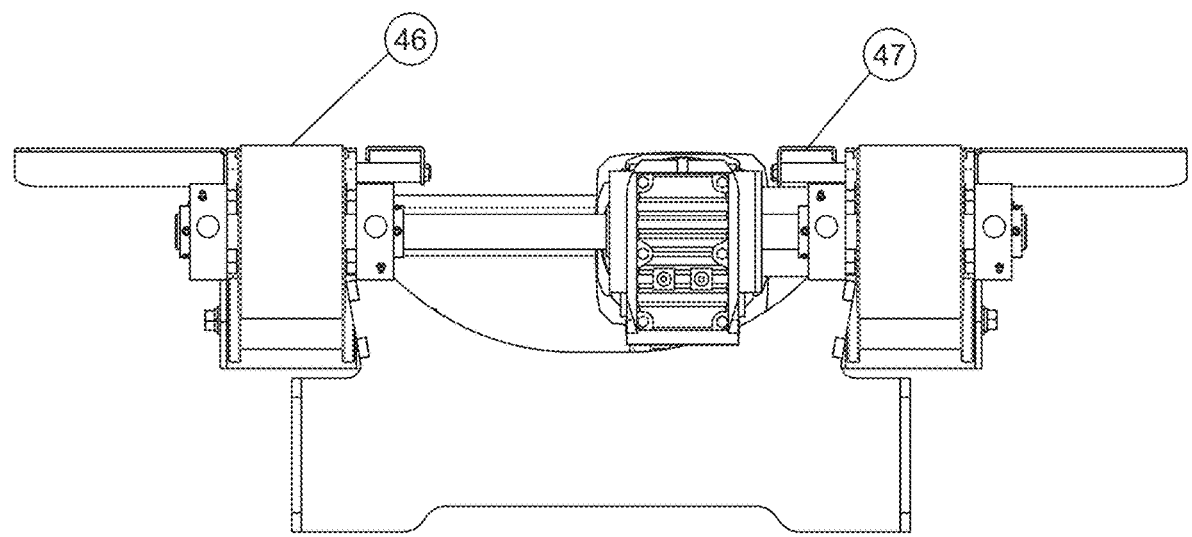

FIGS. 22a-22d show views of an exemplary embodiment of the conveyor system of the pan cleaning system of FIG. 1. FIG. 22a shows the isometric view of the magnetic conveyor where said bun pans 3 are placed for carriage thru the pan cleaner 1 for the purpose of cleaning said bun pans 3. The conveyor 430 provides two parallel paths of tractive magnetic elements 47 for said bun pans 3. On the sides of the conveyor paths are mounted pan conveyor magnets 47 to attract and create the magnetization of the ferrous bun pans 3. The generated strong attractive forces being able to hold the bun pans 3 in position while they are moved along the conveyor 430 on a conveyor belt surfaces 46 and thru the forces and loadings imparted on them as they pass thru and are exposed to the various forces subjected upon them by the various cleaning stations or sub-system or modules.

The conveyor 430 can also take bun pans 3 as they are presented to the pan cleaner 1 and load them on and thru the pan cleaner 1. They do not need to be loaded and indexed onto carriers or to specific locations such that they will arrive at specific locations or modules for cleaning at specific times and the like. This reduces feed complexity of the stream of contaminated pans 3 to the machine 1. To ensure that the bun pans 3 are held to or adhere to the pan conveyor belts 46 to not be motivated by any or the entire pan cleaning devices the pan conveyor magnets 47 located adjacent to the conveyor belts 46 are attached to the sides of the belt support surface 44. The bun pans 3 then travel towards and approach the first cleaning section comprising modules 1 and 2 (m1, m2), as further described herein in relation to FIGS. 2 and 3 above. The pans 3 will get an initial sweep by the cylindrical, rotational brushes 8 so that any buns 2 that may be sitting atop of a bun pan 3 or in a pan pocket 5 due to incomplete removal at the de-panning device (not shown) can be removed before cleaning and drawn up the first vacuum hood 10.

Though strictly lateral conveyance via nonlinear belts is possible, in the exemplary embodiments shown the belts that provide transport of the pans are held and constrained in a lateral, fixed linear direction, so as to maintain the pan in direct passage thru the pan cleaner device 1. This orientation minimizes the possibility of lateral slippage of the pan which could cause incomplete cleaning of the pan surface as well as possible jamming of the pan upon passage and emergence of the pan from the pan cleaner. The magnets 47 are installed to attract the pan to the magnet thereby pull the pans to the belt 46 and providing for greater security in passage. The belts 46 are in turn guided in the direction of travel by travel guides 45 on the frame 43. After passing along the length of the conveyor 430 the pans 3 exit the pan cleaning machine 1.

The method of the invention is directed to a method to remove possible sources of pan and/or product contamination from a commercial baking process. To accomplish this a method for removal or alleviation of these materials from a pan by providing a system or method of operating or means of optimized cleaning of these pan perimeter surfaces is provided herein.

In the method a source of pans 3 needing cleaning or removal of contaminants is provided on a transport medium. The transport medium, including but not limited to a conveyor 430 having magnetic coupling devices, herein magnets 47, and at least one conveyor belt 46. The conveyor belt 46 is arranged to pass the pans 3 into a pan cleaning machine 1 having at least one cleaning module. In the exemplary embodiment shown, the process includes a first cleaning section incorporating first and second modules having horizontal brushes 8 and a first vacuum hood 10, as described in greater detail in relation to the description of FIGS. 1 and 2 above. The first and second modules (m1, m2) providing a first light brushing of the pan 3 to remove loose contaminants and buns/bun remnants 2 that have not been depanned and some contaminants.

The exemplary embodiment of the process passes the pans 3 to a second cleaning section, providing a novel cleaning sub-system or module four (m4) as shown and described in FIGS. 4-17c above. This processes the pan and cleans the perimeter and top surface of the pan 3 and can also be adjusted to provide a thorough cleaning extending into the pockets 5 of the pans 3 based on cleaning parameters. In contacting pan 3, it was thought that a uniform brush as exists in the prior art if used to try and strike the required surfaces would not fully do what is required due to angle of brush bristle contact and ability of the brushes to contact all surfaces. The process of the instant invention provides a brush where the bristles would emanate out from the brush bristle holding body 26 so that they clean or brush against the perimeter surfaces 6, 7 of the pan and if the angles were held, e.g., not significantly deflected, that these brushes could contact both the inside pan perimeter surface 7 as well as the outside surfaces of the pan perimeter 5 more effectively.

The method of the invention also realizes the need for brushing of the entire leading as well as trailing perimeter of the pan. The brushes used clean in the most optimal way when, as the bristles contact the main pan surface, they do so at an angle that allows the bristle to brush the surfaces with the tip of the bristle rather than have the bristle bend and then all bristles behind it would also bend and lay on each other so that in effect they would only be wiping or glance stroking the pan surface. Thus, the method of the invention uses a process whereby the brushes are consistently striking at angles to provide optimal contact to the perimeter of the surface at angles that allow the brush tips to remain in contact and at pressures that allow for the brushes to clean at their tips with minimal deflection and little or no lay up upon each other.

To achieve this, the bristles are presented in an offset in the rotational path of the brush head to not be able to contact leading bristles so as to sympathetically lay on top of one another in a layer. Instead, the bristle tips are maintained in contact and the deflection that transitions from a brushing to a sweeping motion avoided in a first method. The exemplary method of the invention also provides a controlled pressure via the module mounting mechanism, as seen in FIGS. 4-17c, to realize the tip contact of the process. It is of note that the system, by its modular and adjustable nature, can override the desired pressure and angle to keep the tips in contact and effectively "push harder" on the brushes to create the bending if a wiping action is desire for a different cleaning parameter as described herein.

A further aspect of the method of cleaning is to provide sufficient over lap of the brush heads during cleaning so that when the brush tips are going into contact during compression and the sweeping process begins with the lip and the compression of the bristles does occur due to the change in the height of the pan lip, that the brushes present a minimum sweeping angle of about 30 to 60 degrees even in compression where it can also be understood the overall effective width of the brush is reduced but the brushes in the third module m3 are arranged such that they present significant overlap and even with the reduced contact area at a single brush, the entirety of the lip of the pan is cleaned by at least one of the brushes at any given time while in the area.

For the front and rear surfaces, in an exemplary embodiment of the process of the invention, the instant invention uses one hundred percent overlap of the brush heads in the cleaning path, which provides sufficient overlap and cleaning around the entire perimeter. A non-limiting example of such an overlap is shown, but it is certainly not the limit of the process or device, where the brush centers in a travel path would be three and a half inches apart and the diameter of the brushes would be on seven inch centers, thereby allowing brushes to also be brushing the top pan surface.

For cleaning of the sides of the pans where the brushes were not in an optimal location, as the pans often vary in width depending on the products to be made and sizes of the products, to clean the side perimeter edges of the pans the non-limiting, further exemplary process and the further non-limiting exemplary device for carrying out the process provides an overlap of three times or three hundred percent, which is used in the exemplary embodiment for example where the center to center locations of the shafts would be at two and three eighths inches across the travel path of the pan and the brush diameter would be at seven inches.

The process of the instant invention also provides remediation of spinning moments of the pan. The direction of rotation of the brushes is improved in the exemplary embodiment of the process and device executing the process in that the various rotational moments of the individual brushes are cancelled by one another in the layout indicated. In the brush head where each brush that is across the travel path of the pan in the exemplary embodiment alternates in rotational direction as an example, but would certainly not be limited to, when going from left to right such that the first brush would rotate in a clockwise direction and the second would be counter clockwise, the next again being clockwise and alternating in this manner across the width of the pan.

This provides balanced side loading of force placed on the pan as it goes thru the pan cleaner and is held to and by the conveyor belts. If all of the brushes were to be rotating in the same direction, then when a pan approaches and contacts the brushes then the brush would be forcing or driving the pan to go to the side or off of the conveyor. And since the device is brushing the outside edges of the pans this cleaning and brush operating area would be interfering with the utilization or placement of guides in this area.

The exemplary process of the invention then passes the pan to a third cleaning section, comprising modules four and five, whereby a final brush utilizing a wide planar brush is applied and a corresponding second vacuum hood 41 is provided. The remaining contaminants being removed from the pan 3 and the pan 3 being cleaned and passed along from the cleaning machine 1.

In addition to the novel cleaning process of the instant invention as enumerated above, additional aspects of further exemplary embodiments of the instant invention can provide for a programmable controller to execute movement of the aforementioned modules on arms. The movement, as enumerated above, can be used to engage or disengage the modules as desired. The movement can also provide greater or lesser pressure to be exerted at the given interface of each module with the pan 3 as determined by cleaning parameters and engagement parameters as previously discussed. This controls the arms and thereby the modules in the cleaning process being implemented by the controller 14a.

Similarly, the process can incorporate sensors as described herein above in relation to FIG. 1 in an alternate embodiment of the process of operation of the instant invention. These sensors can, for example but are certainly not limited to, providing a further step in the process of scanning and analyzing the condition of the pan with respect to the contaminants on the pan or the condition of the non-stick glaze and the controller 14a and the further exemplary embodiment of the process of the invention can provide additional steps based on the output from the sensor. These steps an include but are not limited to adjusting the cleaning parameters to suit the detected contaminants or passing the pan to a sorting conveyor to be removed from service.

The embodiments and examples discussed herein are non-limiting examples. The invention is described in detail with respect to preferred embodiments, and it will now be apparent from the foregoing to those skilled in the art that changes, and modifications may be made without departing from the invention in its broader aspects, and the invention, therefore, as defined in the claims is intended to cover all such changes and modifications as fall within the true spirit of the invention.

What is claimed is:

1. A module in a modular pan cleaning machine in a commercial baking production line, comprising:
   at least one rotary brush module in the modular pan cleaning machine in the commercial baking production line with the rotary brush module mechanically cleaning a pan in a dry cleaning process, the at least one rotary brush module having:
   a mounting plate coupled to a drive system;
   at least two brushes coupled to the mounting plate and spaced thereon so as to provide overlap in a line of travel for other of each of the at least two brushes with respect to the each of the at least two brushes over a pan within the pan cleaning machine;

at least one shaft extending from each of the at least two brushes through the mounting plate and coupling to the drive system such that the at least one shaft on each brush of the at least two brushes is driven and spins the at least two brushes;

each of the at least two brushes having a brush mounting plate with an at least one upper cartridge coupled to the drive system through a pulley member and having the shaft being rotatably passed through the mounting plate to the brush mounting plate;

an at least one lower cartridge and a cartridge fastener coupling the lower cartridge with an at least one distal end of the shaft, and an at least one brush element extending from the brush shaft, the at least one brush element having an at least one brush body having a plurality of bristles extending therefrom that deform on contact with a pan and clean the pan along a path of movement of the at least two brushes such that the overlap in the spacing of the at least two brushes on the path compensates for a deformation of the plurality of bristles in cleaning the pan and thereby provides additional coverage and contact of the bristles with the pan along the path of movement of each of the at least two brushes.

2. The rotary brush module of claim 1, wherein the overlap in the spacing of the at least two brushes on the path is adapted to cover the deformation so as to leave no gap of uncleaned area on the pan.

3. The rotary brush module of claim 1, wherein the at least two brushes further comprise a first of the at least two brushes and a second of the at least two brushes.

4. The rotary brush module of claim 3, wherein the spacing of the at least two brushes is staggered in at least two rows, a first row of the at least two rows having the first of the at least two brushes and a second row of the at least two rows having the second of the at least two brushes, the respective brushes and rows forming a staggered overlap width.

5. The rotary brush module of claim 4, wherein the staggered overlap width is between about one hundred and two hundred percent of one half of a center on center shaft distance of the respective at least two brushes and a corresponding first of an at least one shafts and a second of an at least one shafts and the distance there between in the respective staggered rows.

6. The rotary brush module of claim 4, wherein the first of the at least two brushes rotates clockwise or counter clockwise and the second of the at least two brushes rotates opposite the first in paired fashion.

7. The rotary brush module of claim 1, wherein the plurality of bristles further comprises an at least one inner bristle and an at least one outer bristle relative to the at least one shaft, each bristle extending at an inner bristle angle and an outer bristle angle respectively from the at least one brush element.

8. The rotary brush module of claim 1, further comprising a controller adapted to measure and adjust a pressure exerted through the brush module and thereby accommodating variations in the shape of the pan to consistently clean the pan and the entire pan shape with the at least two brushes on said pan during mechanical cleaning.

9. The rotary brush module of claim 8, wherein the controller further comprises a height adjustment controller controlling height relative to the pan and the pressure exerted by brushes on said pan and maintain contact with the pan while mechanically cleaning the pan.

10. The rotary brush module of claim 9, wherein the controller is adapted to vary the pressure as the pan contacts the brush module during mechanical cleaning and is moved across the rotary brush module.

11. The rotary brush module of claim 8, further comprising an at least one sensor and an at least one actuator coupled to the rotary brush module and communicating with the controller the pressure being measured by the at least one sensor and the controller thereby adjusting said pressure through output from the controller to the actuator.

12. The rotary brush module of claim 11, further comprising an at least one further sensor and an at least one further actuator communicating with the controller and indicating a tilt of the module relative to the pan and the controller being adapted to further control the tilt through the at least one further actuator and thereby the angles of the at least two rotary brushes relative to the pan.

13. The rotary brush module of claim 1, wherein each brush of the at least two brushes in the rotary brush module is detachably coupled to the at least one brush shaft by a detachable coupling.

14. A module in a modular pan cleaning machine in a commercial baking production line, comprising:

at least one rotary brush module in the modular pan cleaning machine in the commercial baking production line with the rotary brush module mechanically cleaning a pan in a dry cleaning process, the at least one rotary brush module having:

a mounting plate coupled to a drive system;

at least two brushes coupled to the mounting plate and spaced thereon so as to provide overlap in a line of travel for each of the at least two brushes with respect to the each of the other at least two brushes over a pan within the pan cleaning machine;

at least one shaft extending from each of the at least two brushes through the mounting plate and coupling to the drive system such that the at least one shaft on each brush of the at least two brushes is driven and spins the at least two brushes;

a controller;

an at least one tilt sensor and an at least one actuator communicating with the controller and indicating a tilt of the module relative to the pan and the controller being adapted to further control the tilt through the at least one actuator and thereby the angles of the at least two brushes relative to the pan; and an at least one brush element extending from the at least one shaft, the at least one brush element having a plurality of bristles that deform on contact with a pan and clean the pan along a path of movement of the at least two brushes such that the overlap in the spacing of the at least two brushes on the path compensates for a deformation of the plurality of bristles in cleaning the pan and thereby provides additional coverage and contact of the bristles with the pan along the path of movement of each of the at least two brushes.

15. The rotary brush module of claim 14, wherein the detachable coupling is a quick release coupling.

16. The rotary brush module of claim 14, wherein the overlap in the spacing of the at least two brushes on the path is adapted to cover the deformation so as to leave no gap of uncleaned area on the pan.

17. The rotary brush module of claim 14, wherein the at least two brushes further comprise a first of the at least two brushes and a second of the at least two brushes and the spacing of the at least two brushes is staggered in at least two rows, a first row of the at least two rows having the first of the at least two brushes and a second row of the at least two rows having the second of the at least two brushes, the respective brushes and rows forming a staggered overlap width.

18. The rotary brush module of claim 17, wherein the staggered overlap width is between about one hundred and two hundred percent of one half of a center on center shaft distance of the respective at least two brushes and a corresponding first of an at least one shafts and a second of an at least one shafts and the distance there between in the respective staggered rows.

19. The rotary brush module of claim 14, wherein the controller is further adapted to measure and adjust a pressure exerted through the brush module and thereby accommodate variations in the shape of the pan to consistently clean the pan and the entire pan shape with the at least two brushes on said pan during mechanical cleaning.

20. The rotary brush module of claim 19, wherein the controller further comprises a height adjustment controller controlling height relative to the pan and the pressure exerted by brushes on said pan and maintain contact with the pan while mechanically cleaning the pan.

21. The rotary brush module of claim 20, wherein the controller is adapted to vary the pressure as the pan contacts the brush module during mechanical cleaning and is moved across the rotary brush module.

22. The rotary brush module of claim 19, further comprising an at least one sensor and an at least one actuator coupled to the rotary brush module and communicating with the controller the pressure being measured by the at least one sensor and the controller thereby adjusting said pressure through output from the controller to the actuator.

* * * * *